(12) United States Patent
Hasejima et al.

(10) Patent No.: US 10,755,421 B2
(45) Date of Patent: Aug. 25, 2020

(54) TRACKING DEVICE

(71) Applicant: CLARION CO., LTD., Saitama-shi, Saitama (JP)

(72) Inventors: Noriyasu Hasejima, Tokyo (JP); Takehito Ogata, Saitama (JP); Kenji Katou, Saitama (JP)

(73) Assignee: CLARION CO., LTD., Saitama (JP)

( * ) Notice: Subject to any disclaimer, the term of this patent is extended or adjusted under 35 U.S.C. 154(b) by 247 days.

(21) Appl. No.: 15/777,133

(22) PCT Filed: Nov. 22, 2016

(86) PCT No.: PCT/JP2016/084649
§ 371 (c)(1),
(2) Date: May 17, 2018

(87) PCT Pub. No.: WO2017/094567
PCT Pub. Date: Jun. 8, 2017

(65) Prior Publication Data
US 2018/0342068 A1    Nov. 29, 2018

(30) Foreign Application Priority Data

Dec. 4, 2015 (JP) .................................. 2015-237513

(51) Int. Cl.
*G06T 7/207* (2017.01)
*G08G 1/16* (2006.01)
(Continued)

(52) U.S. Cl.
CPC .......... *G06T 7/207* (2017.01); *G06K 9/00805* (2013.01); *G06T 7/254* (2017.01);
(Continued)

(58) Field of Classification Search
None
See application file for complete search history.

(56) References Cited

U.S. PATENT DOCUMENTS

| 8,229,173 B2* | 7/2012 | Kawakami | G06T 7/285 |
| | | | 382/107 |
| 2006/0204039 A1* | 9/2006 | Maemura | B60T 7/22 |
| | | | 382/104 |

(Continued)

FOREIGN PATENT DOCUMENTS

| EP | 3179445 A1 | 6/2017 |
| JP | 2008-219063 A | 9/2008 |

(Continued)

OTHER PUBLICATIONS

Extended European Search Report dated Jun. 27, 2019 for the European Patent Application No. 16870504.4.
International Search Report for WO 2017/094567 A1, dated Jan. 31, 2017.

*Primary Examiner* — Kim Y Vu
*Assistant Examiner* — Molly Delaney
(74) *Attorney, Agent, or Firm* — Volpe and Koenig, P.C.

(57) ABSTRACT

A tracking device includes: an imaging unit that inputs an image into an image input unit; a first moving body detection unit that calculates an optical flow and detects a position and a direction of movement of a moving body based on the calculated optical flow; a second moving body detection unit that detects a position and a direction of movement based on a plurality of overhead images generated; a third moving body detection unit that detects a position and a direction of movement by integrating detection results from the first and second moving body detection units; a tracked moving body confirmation unit that determines a moving body to be tracked based on detection results from the first to third moving body detection units; an estimation unit that estimates a future position and direction of movement; and a tracking unit that tracks the tracked moving body and identifies a position.

7 Claims, 24 Drawing Sheets

(51) Int. Cl.
*H04N 7/18* (2006.01)
*G06T 7/292* (2017.01)
*G06T 7/269* (2017.01)
*G06T 7/254* (2017.01)
*G06T 7/277* (2017.01)
*G06K 9/00* (2006.01)

(52) U.S. Cl.
CPC .............. *G06T 7/269* (2017.01); *G06T 7/277* (2017.01); *G06T 7/292* (2017.01); *G08G 1/16* (2013.01); *G08G 1/166* (2013.01); *H04N 7/18* (2013.01); *H04N 7/183* (2013.01); *B60R 2300/8093* (2013.01); *G06T 2207/10016* (2013.01); *G06T 2207/20076* (2013.01); *G06T 2207/20224* (2013.01); *G06T 2207/30241* (2013.01); *G06T 2207/30261* (2013.01)

(56) References Cited

U.S. PATENT DOCUMENTS

| | | | |
|---|---|---|---|
| 2013/0016877 A1* | 1/2013 | Feris | G06K 9/00771 382/103 |
| 2018/0259329 A1* | 9/2018 | Yokoi | G06T 7/20 |
| 2019/0325607 A1* | 10/2019 | Ohnishi | B60R 1/00 |
| 2019/0359134 A1* | 11/2019 | Yamamoto | B62D 13/00 |
| 2019/0392192 A1* | 12/2019 | Dubey | G06K 9/00718 |

FOREIGN PATENT DOCUMENTS

| | | |
|---|---|---|
| JP | 2011-048520 A | 3/2011 |
| JP | 2011-065338 A | 3/2011 |
| JP | 2011-151459 A | 8/2011 |
| WO | 2016/117200 A1 | 7/2016 |

\* cited by examiner

FIG. 3

| RECORD NUMBER | FIRST DETECTION RESULT RES1 | |
|---|---|---|
| | FIRST CANDIDATE REGION | |
| | COORDINATES | DIRECTION OF MOVEMENT |
| 1 | (sx1,xy1),(ex1,ey1) | ↑ |
| 2 | (sx2,xy2),(ex2,ey2) | ↓ |
| 3 | . | . |
| . | . | . |

FIG. 4

| RECORD NUMBER | SECOND DETECTION RESULT RES2 ||||| 
| | SECOND CANDIDATE REGION ||||| 
| | OVERHEAD IMAGE || FRONT IMAGE |||
| | CENTER OF GRAVITY G | CLOSEST POINT OF APPROACH Ha | CLOSEST POINT OF APPROACH Hb | DIRECTION OF MOVEMENT |
|---|---|---|---|---|
| 1 | (gx1,gy1) | (hax1,hay1) | (hbx1,hby1) | → |
| 2 | (gx2,gy2) | (hax2,hay2) | (hbx2,hby2) | → |
| 3 | · | · | · | · |
| · | · | · | · | · |

FIG. 5

| RECORD NUMBER | INTEGRATED OBJECT MOF | |
|---|---|---|
| | INTEGRATED CANDIDATE REGION | |
| | COORDINATES | DIRECTION OF MOVEMENT |
| 1 | (X11,Y11),(X14,Y14) | ↓ |
| 2 | . | . |
| 3 | . | . |
| . | . | . |

FIG. 6

| RECORD NUMBER | TRACKED MOVING BODY DMO | | | | |
|---|---|---|---|---|---|
| | MOVING BODY | | | | TRACKING CERTAINTY FACTOR |
| | PREDICTED POSITION | SPEED | DIRECTION OF MOVEMENT | UPDATED POSITION | |
| 1 | (X11,Y11),(X14,Y14) | 1m/s | ← | UNCERTAIN | 40 |
| 2 | · | · | · | · | · |
| 3 | · | · | · | · | · |
| · | · | · | · | · | · |

FIG. 7

| RECORD NUMBER | MOVING BODY CANDIDATE CPE | | | | | |
|---|---|---|---|---|---|---|
| | MOVING BODY CANDIDATE REGION | | | | UPDATED POSITION | MOVING BODY CERTAINTY FACTOR |
| | PREDICTED POSITION | | | DIRECTION OF MOVEMENT | | |
| | CANDIDATE 1 | CANDIDATE 2 | ... | | | |
| 1 | (x11,y11), (x14,y14) | (x21,y21), (x24,y24) | ... | → | UNCERTAIN | 20 |
| 2 | · | · | · | · | | · |
| 3 | · | · | · | · | | · |
| · | · | · | · | · | | · |

FIG. 12
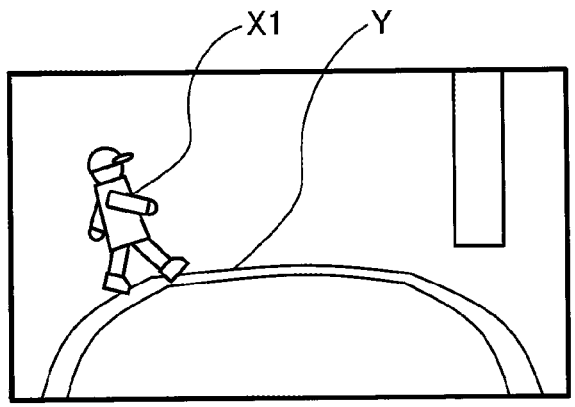
(a)
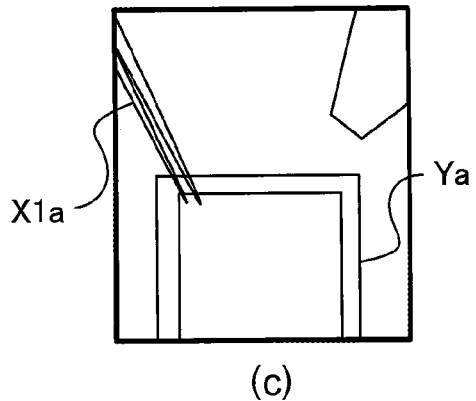
(c)
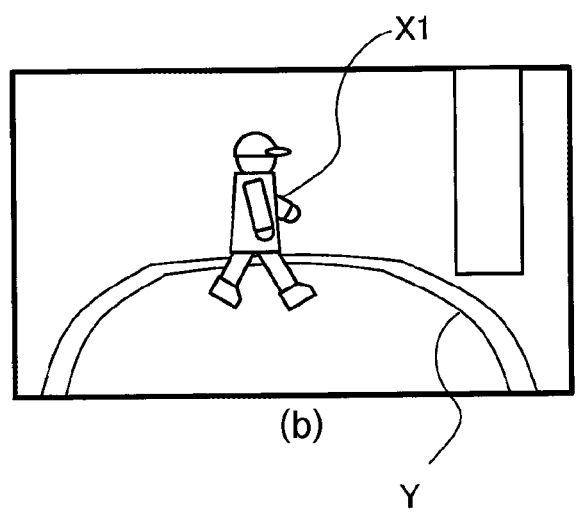
(b)
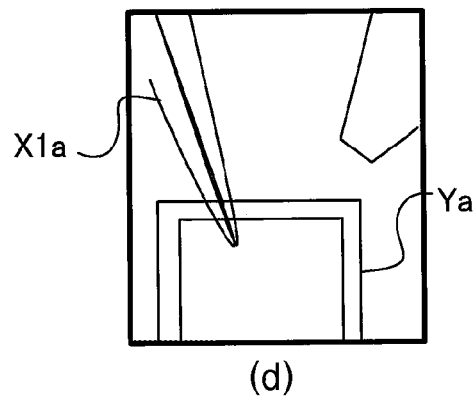
(d)
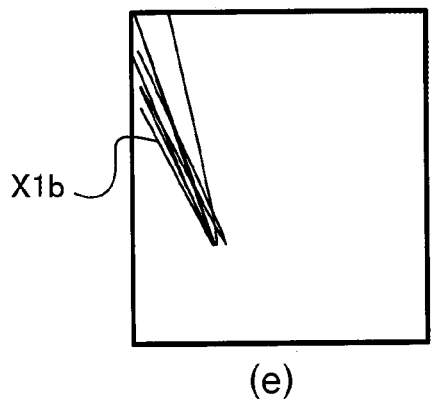
(e)

FIG. 13
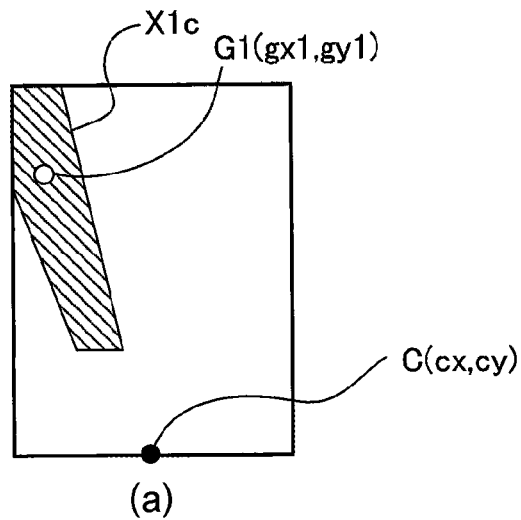
(a)
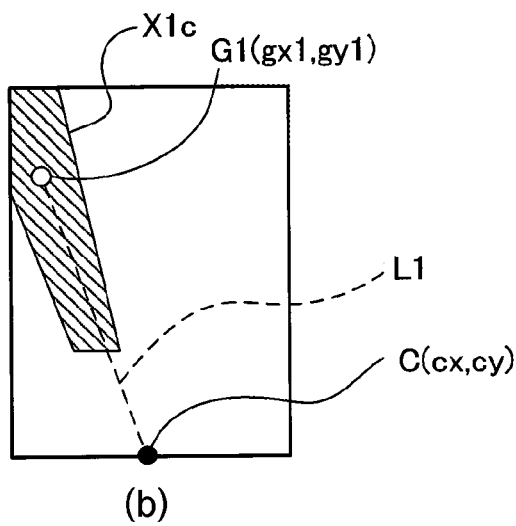
(b)
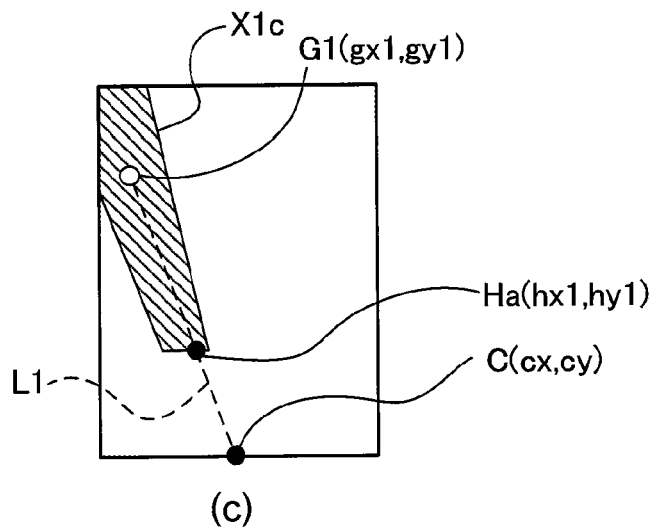
(c)

FIG. 15
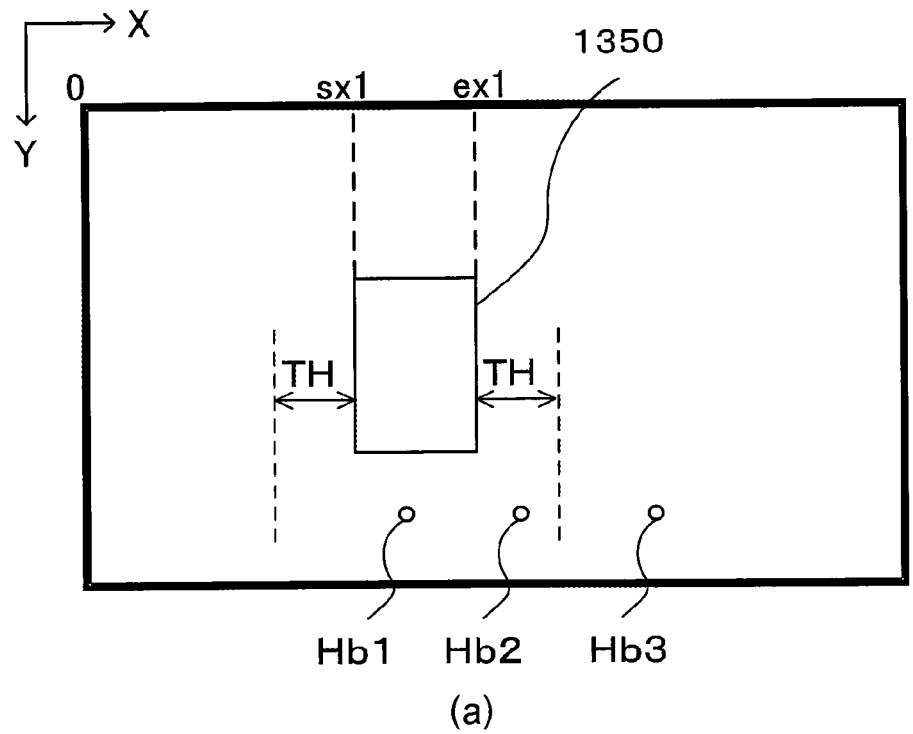
(a)
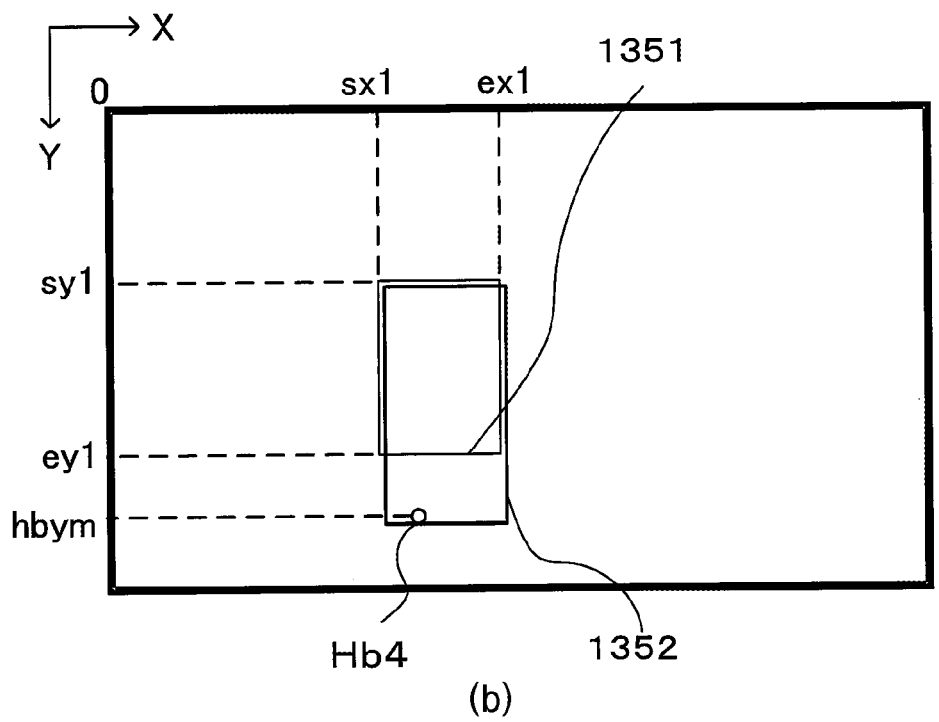
(b)

FIG. 19

| CONDITION | | PROCESS | | |
|---|---|---|---|---|
| COINCIDENCE OF COORDINATES | DIRECTION OF MOVEMENT | UPDATED POSITION | DIRECTION OF MOVEMENT | TRACKING CERTAINTY FACTOR |
| INTEGRATED CANDIDATE REGION | COINCIDE | INTEGRATED CANDIDATE REGION | INTEGRATED CANDIDATE REGION | GREATLY INCREASED |
|  | NOT COINCIDE |  | NO CHANGE |  |
| FIRST CANDIDATE REGION | COINCIDE | MOVING BODY | FIRST CANDIDATE REGION | DECREASED |
|  | NOT COINCIDE |  | NO CHANGE |  |
| SECOND CANDIDATE REGION | COINCIDE | SECOND CANDIDATE REGION | SECOND CANDIDATE REGION | NO CHANGE |
|  | NOT COINCIDE | SECOND CANDIDATE REGION | MOVING BODY | SLIGHTLY DECREASED |
| NONE | — | MOVING BODY | MOVING BODY | GREATLY DECREASED |

FIG. 23

| CONDITION | | | PROCESS | | |
|---|---|---|---|---|---|
| COINCIDENCE OF COORDINATES | DIRECTION OF MOVEMENT | | UPDATED POSITION | DIRECTION OF MOVEMENT | MOVING BODY CERTAINTY FACTOR |
| INTEGRATED CANDIDATE REGION | COINCIDE | | INTEGRATED CANDIDATE REGION | INTEGRATED CANDIDATE REGION | INCREASED |
| | NOT COINCIDE | | ADD TO TRACKED MOVING BODY DMO | | |
| FIRST CANDIDATE REGION | COINCIDE | | MOVING BODY CANDIDATE REGION | FIRST CANDIDATE REGION | DECREASED |
| | NOT COINCIDE | | | NO CHANGE | |
| SECOND CANDIDATE REGION | COINCIDE | | SECOND CANDIDATE REGION | SECOND CANDIDATE REGION | SLIGHTLY DECREASED |
| | NOT COINCIDE | | SECOND CANDIDATE REGION | MOVING BODY CANDIDATE REGION | SLIGHTLY DECREASED |
| NONE | — | | MOVING BODY CANDIDATE REGION | MOVING BODY CANDIDATE REGION | GREATLY DECREASED |

TRACKING DEVICE

TECHNICAL FIELD

The present invention relates to a tracking device.

BACKGROUND ART

Recently, development of a driving support function and an automatic driving technology has been rapidly progressing. In the driving support function, a driver is supported by installing a camera or an external sensor such as a sonar in a vehicle and detecting a moving body present around the vehicle to warn the driver or control the vehicle. In detection of the moving body, to improve a probability of detection, it is effective to trace a position of the moving body using information obtained at different times.

PTL 1 discloses an object tracking device that predicts a current position of an object on a road surface based on a position of the object on the road surface obtained from a past captured image and vehicle motion information, detects the object by setting a detection frame at a corresponding position on a current captured image, estimates a current position of the object based on a foot position of the image in the set detection frame, and estimates a current position of the object on the road surface based on an expansion rate of the object on the current captured image with respect to the object on the past captured image.

CITATION LIST

Patent Literature

PTL 1: JP 2011-65338 A

SUMMARY OF INVENTION

Technical Problem

It is desired to continue tracking of the moving body.

Solution to Problem

According to a first aspect of the present invention, a tracking device includes: an image input unit to which an image obtained by imaging using an imaging unit is input; a first moving body detection unit that calculates an optical flow using a plurality of images input to the image input unit and detects a position and a direction of movement of a moving body based on the calculated optical flow; a second moving body detection unit that detects a position and a direction of movement of the moving body based on a plurality of overhead images generated based on the plurality of images; a third moving body detection unit that detects a position and a direction of movement of the moving body by integrating detection results from the first moving body detection unit and the second moving body detection unit; a tracked moving body confirmation unit that determines a moving body to be tracked based on detection results from the first to third moving body detection units; an estimation unit that estimates a future position and direction of movement of the tracked moving body determined by the tracked moving body confirmation unit; and a tracking unit that tracks the tracked moving body and identifies a position of the tracked moving body using any one of the respective positions of the moving body detected by the respective second and third moving body detection units and the estimated position estimated by the estimation unit.

Advantageous Effects of Invention

According to the invention it is possible to continue tracking of a moving body even when it is impossible to detect the moving body using an optical flow or detect the moving body using an overhead image.

BRIEF DESCRIPTION OF DRAWINGS

FIG. 3 is a diagram illustrating an example of a first detection result RES1.

FIG. 4 is a diagram illustrating an example of a second detection result RES2.

FIG. 5 is a diagram illustrating an example of an integrated object MOF.

FIG. 6 is a diagram illustrating an example of a tracked moving body DMO.

FIG. 7 is a diagram illustrating an example of a moving body candidate CPE.

FIGS. 12(a) to 12(e) are diagrams for description of processing of step S601 to step S604 of FIG. 11.

FIGS. 13(a) to 13(c) are diagrams for description of a process of calculating a closest point of approach Ha from a calculated second candidate region.

FIG. 15(a) is a diagram illustrating a determination example of step S1306 of FIG. 14, and FIG. 15(b) is a diagram illustrating a process example of step S1308 of FIG. 14.

FIG. 19 is a diagram illustrating a table of a process of updating the tracked moving body MO by he tracking processing unit 55.

FIG. 23 is a diagram illustrating a table of a process of updating the moving body candidate CPE by the tracked moving body confirmation unit 54.

DESCRIPTION OF EMBODIMENTS (First Embodiment)

Hereinafter, a description will be Given of a first embodiment in which a moving body detecting device according to the invention is applied to an image processing ECU with reference to FIG. 1 to FIG. 24.

Figure 1:
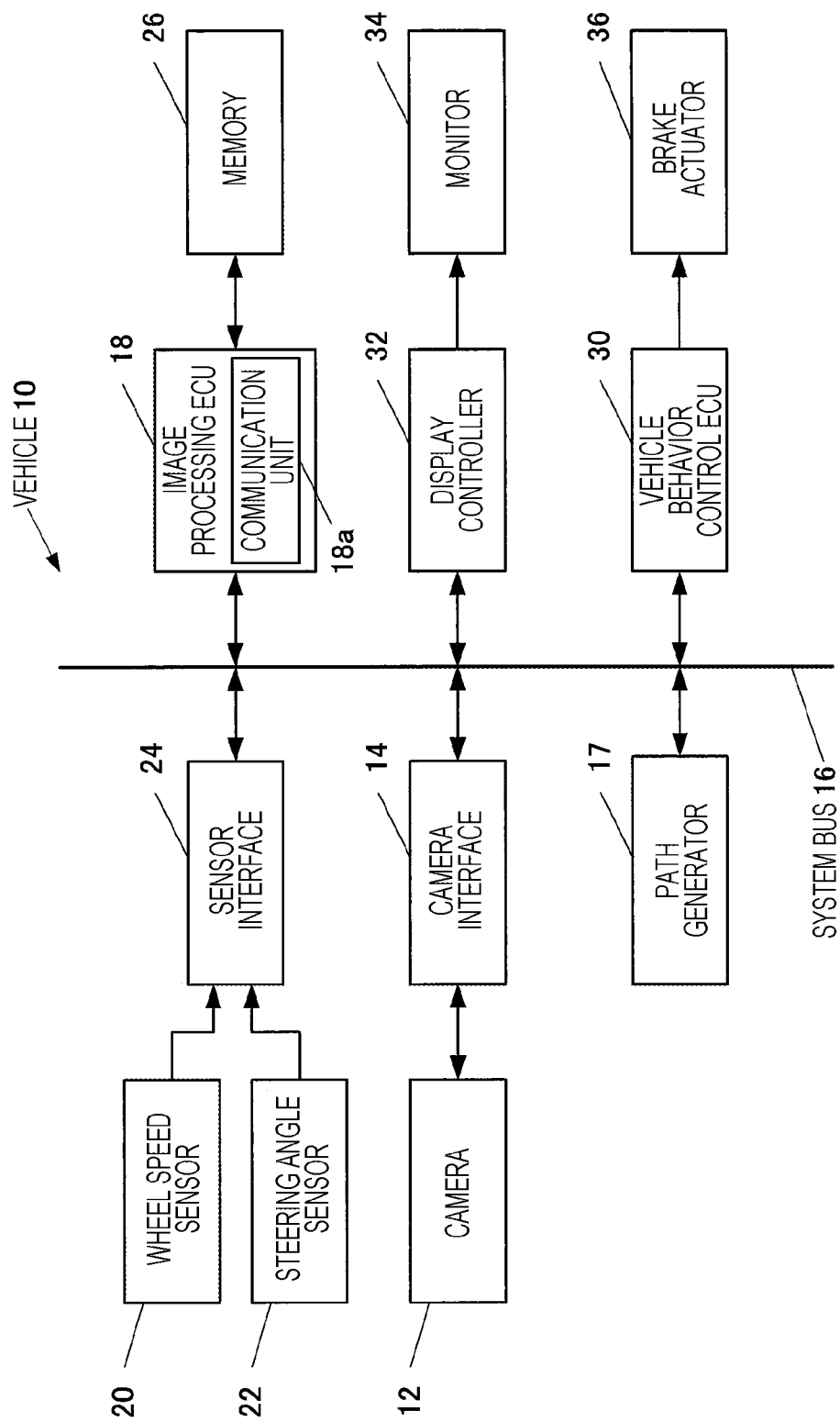
FIG. 1 is a diagram illustrating a configuration of a vehicle 10.

FIG. 1 is a diagram illustrating a configuration of a vehicle 10 mounted with an image processing ECU 18. The vehicle 10 includes a wheel speed sensor 20 for calculating a movement amount of the vehicle 10, a steering angle sensor 22 for calculating a traveling direction of the vehicle 10, a sensor interface 24 that transmits outputs of the wheel speed sensor 20 and the steering angle sensor 22 to the image processing ECU 18 described below, a camera 12 that photographs the surroundings of the vehicle 10, a camera interface 14 that transmits an image photographed by the camera 12 to the image processing ECU 18, a path generator 17 that calculates a moving path of the vehicle 10, the image processing ECU 18 that detects a moving body present around the vehicle 10 using the image photographed by the camera 12, a memory 26 corresponding to a volatile storage area used by the image processing ECU 18 as a temporary storage unit, a monitor 34 that presents information to a user of the vehicle 10, a display controller 32 that controls the monitor 34, a brake actuator 36 that generates a braking force on the vehicle 10, and a vehicle behavior control ECU 30 that outputs an operation command to the brake actuator 36.

The sensor interface 24, the camera interface 14, the path generator 17, the image processing ECU 18, the display controller 32, and the vehicle behavior control ECU 30 are connected by a system bus 16.

The camera 12 performs photographing every predetermined time Δt, for example, 17 milliseconds and outputs information obtained by photographing to the camera interface 14. The camera interface 14 creates an image after performing correction in consideration of an aberration of a lens attached to the camera 12 using the information received from the camera 12 and transmits the created image to the image processing ECU 18. Therefore, a created image is output from the camera interface 14 to the image processing ECU 18 each time the camera 12 performs photographing. Hereinafter, an image output to the image processing ECU 18 by the camera interface 14 is referred to as a "photographed image".

The image processing ECU 18 includes a communication unit 18a, a CPU, a ROM, and a RAM and loads a program saved in the ROM in the RAM to execute the program. The communication unit 18a communicates with the camera interface 14 via the system bus 16 and receives the image photographed by the camera 12. The program stored in the ROM is executed each time the photographed image is input from the camera interface 14. This program saves a part of data necessary for execution in the memory 26. However, a part of the program may be implemented by hardware or saved only in the RAM included in the image processing ECU 18 without using the memory 26.

(Overview of Configuration and Processing of Image Processing ECU 18)

Figure 2:
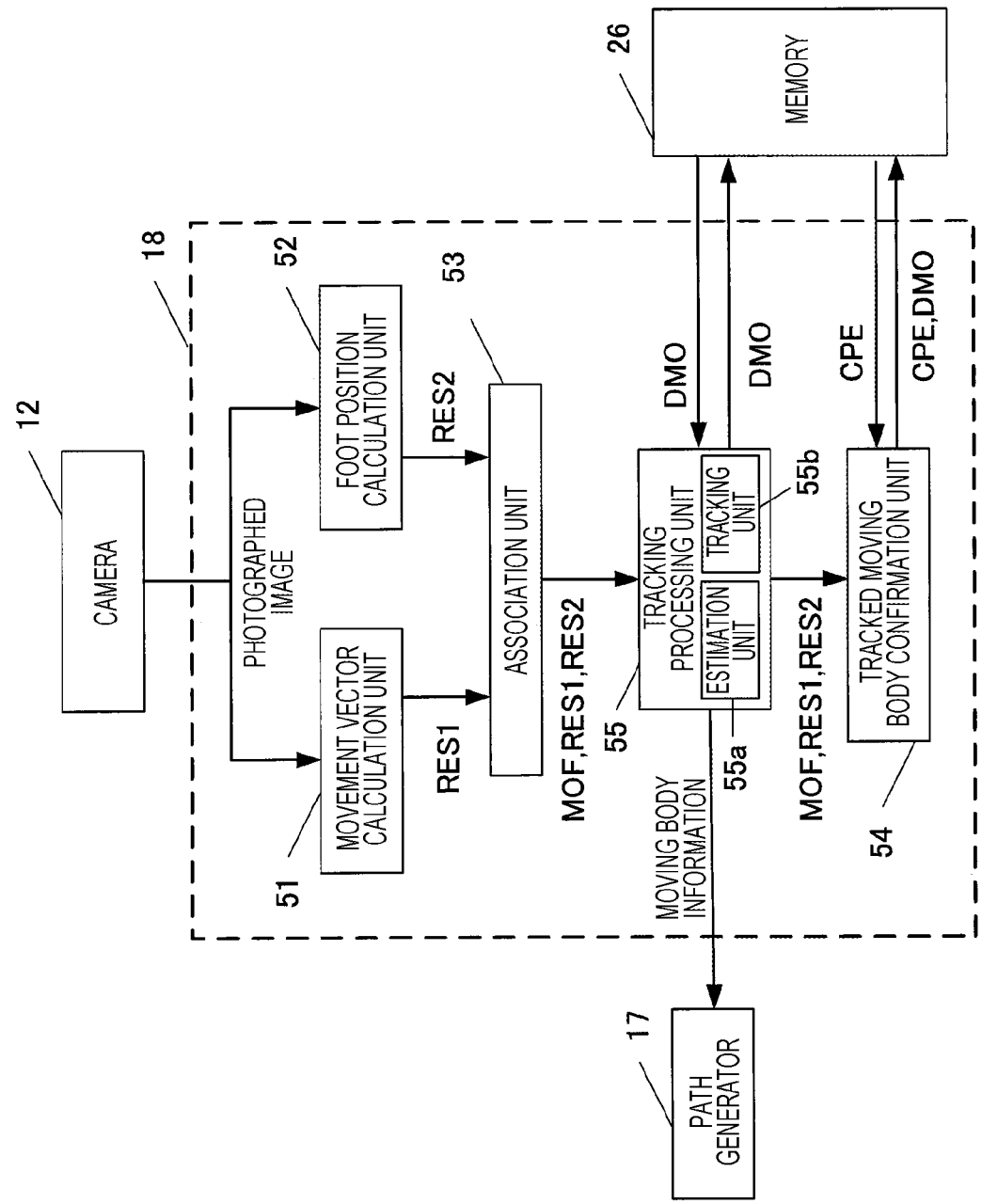
FIG. 2 is a diagram representing a function of a program executed by an image processing ECU 18 as a functional block.

FIG. 2 represents a function of a program executed by the image processing ECU 18 as a functional block and illustrates a correlation between functional blocks. Hereinafter, a description will be given of an overview of processing of each functional block, an overflow of data exchanged between the functional blocks, and an example. Details of the processing of each functional block will be described below.

The image processing ECU 18 includes a movement vector calculation unit 51 to which a photographed image is input, a foot position calculation unit 52 to which the photographed image is similarly input, an association unit 53 that associates calculation results from the movement vector calculation unit 51 and the foot position calculation unit 52 with each other, a tracked moving body confirmation unit 54 that confirms a moving body used as a tracking target, and a tracking processing unit 55 that tracks the moving body used as the tracking target. A first detection result RES1, a second detection result RES2, an integrated object MOF, a moving body candidate CPE, and a tracked moving body DMO described below correspond to a storage area secured in the memory 26. However, information saved in the storage area is referred to by the same name.

The image processing ECU 18 performs a series of processes illustrated in FIG. 2 each time the photographed image is input. The first detection result RES1, the second detection result RES2, and the integrated object MOF are calculated each time the photographed image is input. Meanwhile, the moving body candidate CPE and the tracked moving body DMO are stored in the memory 26 and updated by the tracked moving body confirmation unit 54 and the tracking processing unit 55 each time the photographed image is input. However, immediately after the image processing ECU 18 starts to operate, nothing is stored in the moving body candidate CPE and the tracked moving body DMO, and information is stored in the moving body candidate CPE and the tracked moving body DMO by a process described below.

The movement vector calculation unit 51 receives an input of a photographed image from the camera 12, calculates an optical flow using a latest photographed image and an immediately preceding photographed image, and detects a region (hereinafter a first candidate region) which is likely to correspond to a moving body. Then, coordinates and a direction of movement of the detected first candidate region are output to the first detection result RES1. The first detection result RES1 has the same number of records as that of the first candidate region detected by the movement vector calculation unit 51. For example, the first detection result RES1 is as follows.

FIG. 3 is a diagram illustrating an example of the first detection result RES1. The first detection result RES1 includes one or more records, and coordinates of the first candidate region and a direction of movement of the first candidate region are recorded in each record. The first candidate region is defined as a rectangle, and coordinates thereof are identified by top-left coordinates and bottom-right coordinates. However, the first candidate region is not limited to the rectangle, and it is possible to adopt a region having an elliptical or arbitrary shape. In addition, the direction of movement of the first candidate region may include not only a component of a left-right direction but also a component of a depth direction, that is, a direction approaching/away from the camera 12, and the direction of movement may be expressed by an angle of 0 to 360 degrees. The description will be continued by returning to FIG. 2.

The foot position calculation unit 52 creates overhead images from the latest photographed image and the immediately preceding photographed image, respectively, and detects a region (hereinafter a second candidate region) which is likely to correspond to the moving body from a difference thereof. Then, coordinates of a center of gravity G of the detected second candidate region on the overhead image and coordinates of a closest point of approach Ha with respect to the vehicle 10 on the overhead image are output to the second detection result RES2. The second detection result RES2 has the same number of records as that of the second candidate region detected by the foot position calculation unit 52. Further, the foot position calculation unit 52 calculates a closest point of approach Hb corresponding to the closest point of approach Ha on a plane conversion image in a reverse procedure to that of creation of the overhead images, and similarly outputs the calculated closest point of approach Hb to the second detection result RES2. For example, the second detection result RES2 has the following configuration.

FIG. 4 is a diagram illustrating an example of the second detection result RES2. The second detection result RES2 includes one or more records, and information about the second candidate region in an overhead image and information about the second candidate region in a front image are recorded in each record. The information about the second candidate region in the overhead image refers to coordinates of a center of gravity G of the second candidate region and coordinates of a point closet to the vehicle 10 in the second candidate region, that is, the closest point of approach Ha. The information about the second candidate region in the front image refers to coordinates corresponding to the closest point of approach Ha in the overhead image and is obtained by coordinate-transforming the coordinates of the closest point of approach Ha in the overhead image. The description will be continued by returning to FIG. 2.

The association unit 53 associates the first candidate region detected by the movement vector calculation unit 51 with the second candidate region detected by the foot position calculation unit 52, and stores a region obtained by association (hereinafter an integrated candidate region) and a direction of movement of the integrated candidate region in the integrated object MOF. That is, the association unit 53 receives inputs of the first detection result RES1 in which the first candidate region is recorded and the second detection result RES2 and outputs the integrated object MOF. Further, the association unit 53 deletes a record in which the first detection result RES1 is associated with the second detection result RES2 and performs an output operation. For example, when the first detection result RES1 input to the association unit 53 has three records, the second detection result RES2 input to the association unit 53 has five records, and two records among the records are associated with each other, the number of records output by the association unit 53 is as follows. That is, the integrated object MOF corresponds to two records, the first detection result RES1 corresponds to one record, and the second detection result RES2 corresponds to three records. For example, the integrated object MOF has the following configuration.

FIG. 5 is a diagram illustrating an example of the integrated object MOF. The integrated object MOF includes one or more records, and coordinates of the integrated candidate region in the front image and a direction of movement of the integrated candidate region are recorded in each record. The integrated candidate region is defined as a rectangle, and coordinates thereof are identified by top-left coordinates and bottom-right coordinates. However, the integrated candidate region is not limited to the rectangle, and it is possible to adopt a region having an elliptical or arbitrary shape. In addition, the direction of movement of the integrated candidate region may include not only a component of a left-right direction but also a component of a depth direction, that is, a direction approaching/away from the camera 12. The description will be continued by returning to FIG. 2.

The tracking processing unit 55 includes an estimation unit 55*a* and a tracking unit 55*b*. The estimation unit 55*a* predicts a position of a moving body in a process described below, and the tracking unit 55*b* performs another process. The tracking processing unit 55 reads the integrated object MOF, the first detection result RES1, and the first detection result RES1 output by the association unit 53 and reads the tracked moving body DMO from the memory 26. Information about a moving body which is being tracked is stored as one record for each moving body in the tracked moving body DMO. An example of the tracked moving body DMO will be described below. The tracking processing unit 55 predicts a position of a moving body stored in the tracked moving body DMO, updates the position of the moving body, that is, identifies the position of the moving body, deletes the moving body from a tracking target, that is, deletes a specific record from the tracked moving body DMO, outputs information related to the moving body to the path generator 17, and changes a tracking certainty factor described below. An updated tracked moving body DMO is stored in the memory 26. The tracking processing unit 55 performs a process described below on the integrated object MOF, outputs the integrated object MOF, and outputs the first detection result RES1 and the second detection result RES2 without change. The tracking certainty factor refers to an index indicating a probability of a tracking process for each moving body, and a moving body is deleted from the tracked moving body DMO when the tracking certainty factor is smaller than or equal to a predetermined value. For example, the tracking certainty factor is represented by 0 to 100 and increased or decreased by a process described below from an initial value of 50. When the tracking certainty factor becomes 0, the moving body is deleted from the tracked moving body DMO.

FIG. 6 is a diagram illustrating an example of the tracked moving body DMO. The tracked moving body DMO includes one or more records, and a predicted position corresponding to coordinates of the moving body in the front image in a subsequent frame, a speed of the moving body, a direction of movement of the moving body, a tracking certainty factor, and an updated position corresponding to coordinates of the moving body in the front image in a current frame, that is, an identified position of the moving body are recorded in each record. The integrated candidate region is defined as a rectangle, and coordinates thereof are identified by top-left coordinates and bottom-right coordinates. However, the integrated candidate region is not limited to the rectangle, and it is possible to adopt a region having an elliptical or arbitrary shape. Here, the speed of the moving body is recorded on the assumption that the moving body moves in uniform motion. In addition, the direction of movement of the moving body may include not only a component of a left-right direction but also a component of a depth direction, that is, a direction approaching/away from the camera 12. The description will be continued by returning to FIG. 2.

The tracked moving body confirmation unit 54 reads the integrated object MOF, the first detection result RES1, and the second detection result RES2 output by the tracking processing unit 55 and reads the moving body candidate CPE from the memory 26. Information related to a moving body candidate region corresponding to a candidate for a tracking target is stored as one record for each candidate in the moving body candidate CPE. An example of the moving body candidate CPE will be described below. The tracked moving body confirmation unit 54 adds or deletes a record to or from the moving body candidate CPE, adds a record satisfying a criterion described below to the tracked moving body DMO, and increases/decreases a moving body certainty factor described below. For example, the moving body certainty factor is represented by an integer and increased/decreased from an initial value of 50 by a process described below. The corresponding record is deleted from the integrated object MOF when the moving body certainty factor is smaller than or equal to 0, and the corresponding record is moved from the integrated object MOF to the tracked moving body DMO when the moving body certainty factor exceeds 100.

FIG. 7 is a diagram illustrating an example of the moving body candidate CPE. The moving body candidate CPE includes one or more records, and a plurality of predicted positions in a subsequent frame of the moving body candidate region, a speed of the moving body candidate region, a direction of movement of the moving body candidate region, and a moving body certainty factor are recorded in each record. An expected position of the moving body candidate region is defined as a rectangle, and coordinates thereof are identified by top-left coordinates and bottom-right coordinates. However, the expected position is not limited to the rectangle, and it is possible to adopt a region having an elliptical or arbitrary shape. In addition, the direction of movement of the moving body candidate region may include not only a component of a left-right direction but also a component of a depth direction, that is, a direction approaching/away from the camera 12.

In FIG. 2, even though the moving body candidate CPE and the tracked moving body DMO are saved in the memory 26, the moving body candidate CPE and the tracked moving body DMO do not include any record immediately after the image processing ECU 18 starts to operate. As shown in the overview of the operation, records are added to the moving body candidate CPE and the tracked moving body DMO by processing of the tracked moving body confirmation unit 54. That is, records are added to all the moving body candidate CPE and the tracked moving body DMO stored in the memory 26 by the tracked moving body confirmation unit 54.

(Movement Vector Calculation Unit)

An operation of the movement vector calculation unit 51 will be described using a flowchart. An execution entity of each step described below corresponds to the CPU of the image processing ECU 18.

Figure 8:
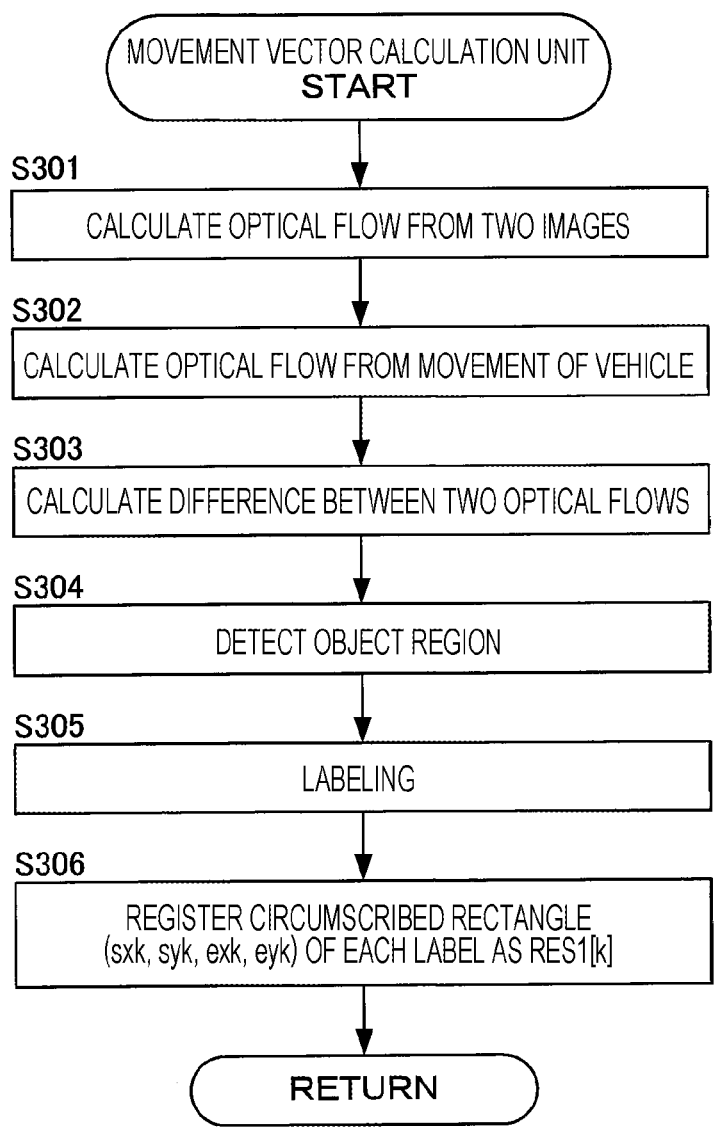
FIG. 8 is a flowchart illustrating an operation of a movement vector calculation unit 51.

FIG. 8 is a flowchart illustrating an operation of the movement vector calculation unit 51.

In step S301, a photographed image received from the camera 12 is converted into a planar projected image obtained by projecting the photographed image on a vertically standing virtual plane. Then, an optical flow is detected from an image obtained by converting a latest photographed image into a planar projected image and an image obtained by converting an immediately preceding photographed image into a planar projected image. For example, the optical flow is calculated as follows. That is, one of the two images used for calculation of the optical flow is divided into a plurality of small regions, a process is performed to search for a small region (the other small region) similar in distribution of grayscale values to each of the small regions from the other image, one associated small region is set as a start point of the optical flow, and the other small region is set as an end point of the optical flow. Subsequently, the operation proceeds to step S302.

In step S302, an optical flow expected to be generated in response to movement of the vehicle 10 during a time Δt from photographing of an immediately preceding image to the present is calculated using outputs of the wheel speed sensor 20 and the steering angle sensor 22 output from the sensor interface 24. Subsequently, the operation proceeds to step S303.

In step S303, a difference between the optical flow calculated in step S301 and the optical flow calculated in step S302 is calculated. An optical flow that excludes an influence of movement of the vehicle 10 is calculated by this process. Subsequently, the operation proceeds to step S304.

In step S304, a region which is likely to correspond to the moving body, that is, the first candidate region is detected using the optical flow calculated in step S303. For example, when the optical flows are close to each other and have the same length in the same direction in the small region corresponding to the endpoint of the optical flow, small regions corresponding to end points of the plurality of optical flows are merged and detected as one first candidate region. Subsequently, the operation proceeds to step S305.

In step S305, each first candidate region detected in step S304 is labeled. However, when an area of the region is smaller than a predetermined area, the region may be regarded as noise and a label may not be attached thereto. Subsequently, the operation proceeds to step S306.

In step S306, a rectangle circumscribing the first candidate region is set for each first candidate region labeled in step S305, and top-left and bottom-right coordinates of the rectangle are registered in the first detection result RES1. Further, a direction of movement of the first candidate region is detected using the optical flow calculated in step S303, and the detected direction of movement is also registered in the first detection result RES1.

A different record for each labeled first candidate region is registered in the first detection result RES1. For example, when five first candidate regions are labeled, five records are registered in the first detection result RES1. Hereinafter, a kth record of the first detection result RES1 will be denoted as RES1[k].

(Process Example of Movement Vector Calculation Unit)

Figure 9:
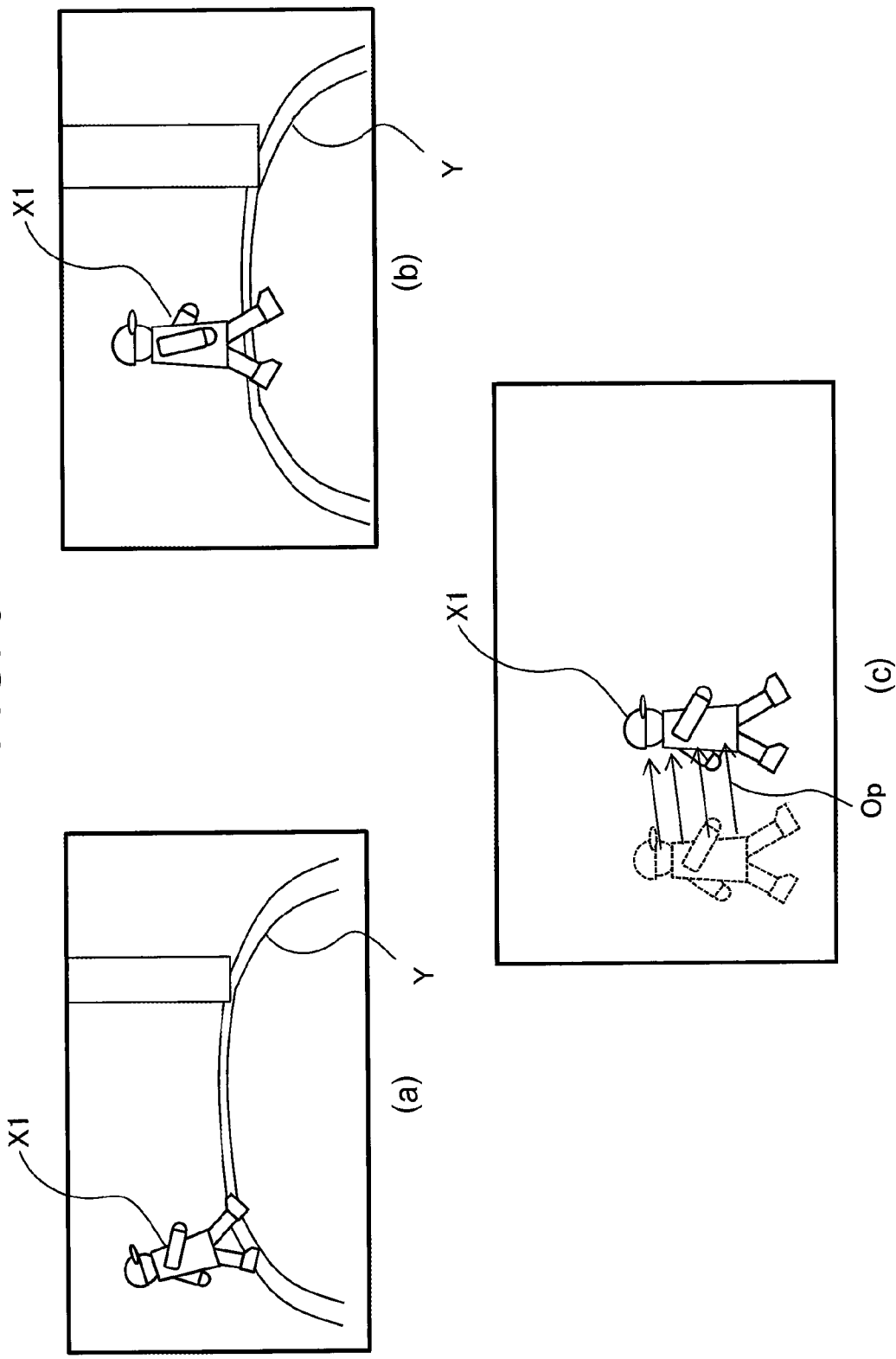
FIG. 9(a) is a diagram illustrating an example of a planar projected image obtained from an image photographed by a camera 12 at time t−Δt.
FIG. 9(b) is a diagram illustrating an example of a planar projected image obtained from an image photographed by the camera 12 at time t.
FIG. 9(c) is a diagram illustrating a result of detecting only on optical flow generated in response to movement of a pedestrian X1.

FIGS. 9(*a*) to 9(*c*) are diagrams for description of a process example of the movement vector calculation unit 51. FIG. 9(*a*) is an example of a planar projected image obtained from an image photographed by the camera 12 at time t−Δt. As illustrated in FIG. 9(*a*), a pedestrian X1 and a parking frame line Y are photographed in this planar projected image.

FIG. 9(*b*) is an example of a planar projected image obtained from an image photographed by the camera 12 at time t. When FIG. 9(*a*) is compared with FIG. 9(*b*), it is understood that the pedestrian X1 moves forward (to a right side in the figure) during time Δt. In addition, since a position of the parking frame line Y moves to an illustrated side, it is understood that the vehicle 10 approaches the parking frame line Y during time Δt.

FIG. 9(c) is a diagram illustrating a result of detecting only an optical flow generated in response to movement of the pedestrian X1. Even though the vehicle 10 also moves during time Δt as described above, an optical flow generated in response to movement of the vehicle 10 is calculated using outputs of the wheel speed sensor 20 and the steering angle sensor 22, and an influence thereof is eliminated by subtracting the optical flow from the optical flow calculated from FIG. 9(a) and FIG. 9(b). In this way, only an optical flow Op representing movement of the pedestrian X1 is detected in FIG. 9(c). By analyzing the optical flow Op detected in this way, regions moving in the same direction and by the same amount are integrated and recognized as one object.

Figure 10:
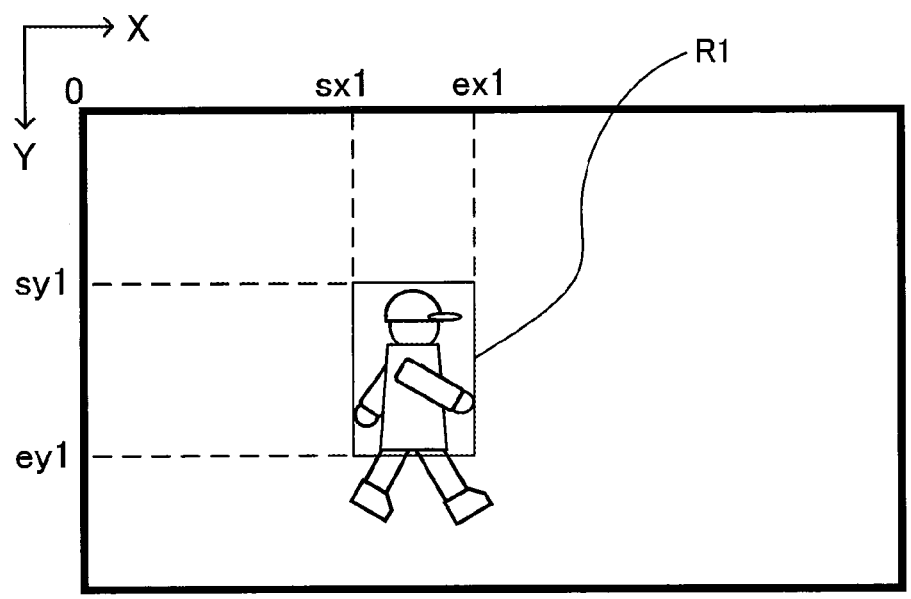
FIG. 10 is a diagram illustrating an example of a detected first candidate region.

FIG. 10 is an example showing the first candidate region detected in this way. As illustrated in FIG. 10, a region of the pedestrian X1 is detected as an object, and a position of a rectangular region R1 circumscribing the pedestrian X1 is stored in the first detection result RES1. Since a foot is difficult to detect in the optical flow, a torso and a head of the pedestrian X1 are detected as the first candidate region.

As described above, the movement vector calculation unit 51 calculates the first candidate region as follows. A plurality of optical flows, that is, movement vectors is calculated using a plurality of images. Movement vectors at the same speed and in the same direction of movement are extracted among a plurality of movement vectors. A region obtained by merging small regions corresponding to endpoints of the extracted movement vectors is the first candidate region. In this way, coordinates and a direction of movement of the first candidate region detected based on the calculated optical flow are registered in the first detection result RES1.

(Foot Position Calculation Unit)

An operation of the foot position calculation unit 52 will be described using a flowchart. An execution entity of each step described below corresponds to the CPU of the image processing ECU 18.

Figure 11:
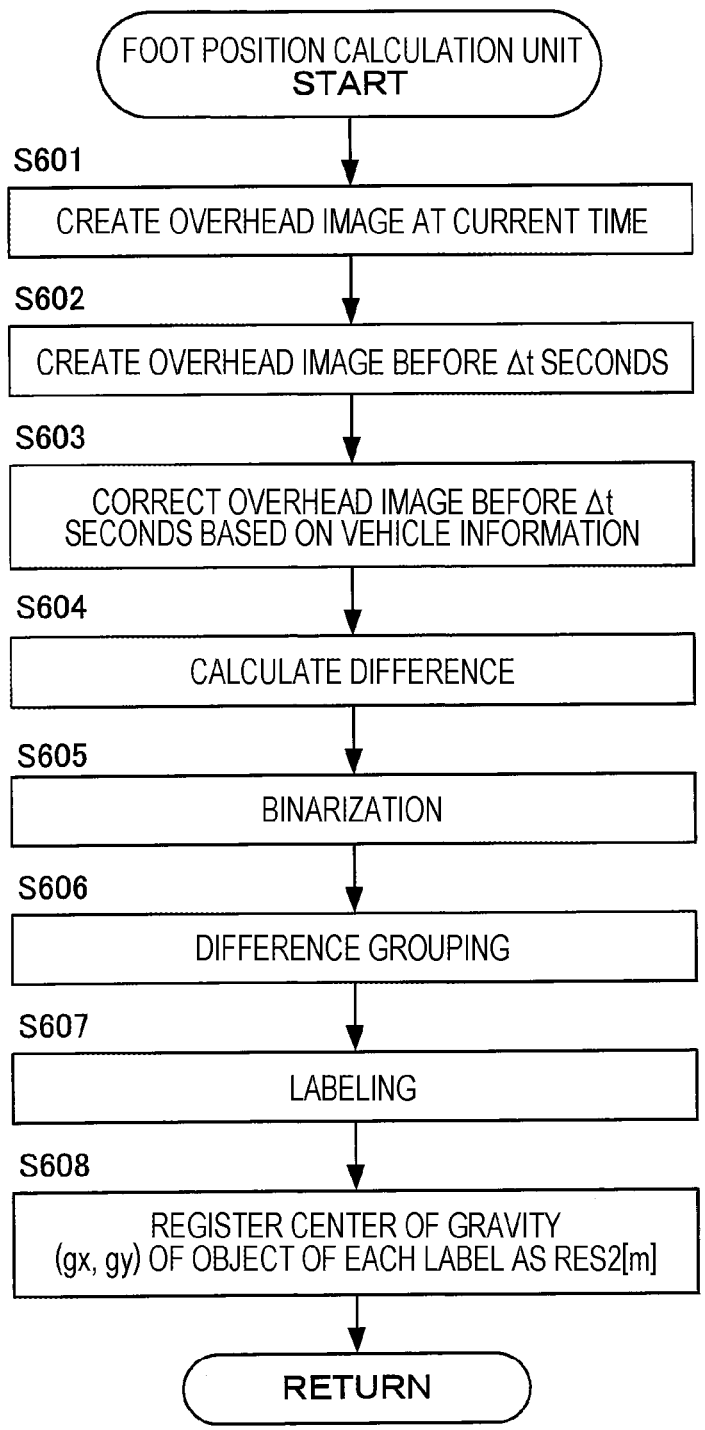
FIG. 11 is a flowchart illustrating an operation of a foot position calculation unit 52.

FIG. 11 is a flowchart illustrating the operation of the foot position calculation unit 52.

In step S601, a photographed image at a current time t received from the camera 12 is converted into an overhead image corresponding to an image looked down from immediately above the vehicle 10. Creation of the overhead image, that is, conversion from the photographed image to the overhead image may be performed using a coordinate conversion table (not illustrated) stored in the memory 26 in advance, an internal parameter of the camera 12 such as a focal distance f, and an external parameter of the camera 12 corresponding to a mounting position or an angle. A correspondence relationship between coordinates of an original image and coordinates of the overhead image is stored in this coordinate conversion table. Subsequently, the operation proceeds to step S602.

In step S602, an immediately preceding photographed image, that is, a photographed image at time t−Δt that traces back from a current time by Δt is converted into an overhead image similarly to step S601, and the operation proceeds to step S603.

In step S603, a movement amount and a direction of movement of the vehicle 10 during time Δt from photographing of an immediately preceding image to the present are calculated using vehicle information, that is, outputs of the wheel speed sensor 20 and the steering angle sensor 22. Further, the overhead image created in step S602, an influence of movement of the vehicle 10 is corrected based on the movement amount and the direction of movement. Subsequently, the operation proceeds to step S604.

In step S604, a difference between the overhead image created in step S601 and the overhead image corrected in step S603 is calculated, and a difference image is generated. Even though the vehicle 10 moves during time Δt, an influence of movement is corrected by correction in step S603. For this reason, the influence of movement of the vehicle 10 is eliminated in the difference calculated in this step. Subsequently, the operation proceeds to step S605.

In step S605, the difference image calculated in step S604 is binarized. A threshold value of binarization may correspond to a predetermined value or a value determined based on the obtained difference image. Subsequently, the operation proceeds to step S606.

In step S606, difference information present within a predetermined distance in a region present in the difference image binarized in step S605 is grouped as belonging to the same group, and the operation proceeds to step S607.

In step S607, a labeling process of assigning a label, for example, a number to each area grouped in step S605 is performed, and the operation proceeds to step S608. However, when an area of the region is less than or equal to a predetermined value, the label may not be assigned.

In step S608, a center of gravity of the region to which the label is assigned (hereinafter second candidate region) is calculated, and coordinates of the center of gravity in the overhead image are saved in the second detection result RES2. In addition, in the overhead image, a closest point of approach Ha corresponding to coordinates closest to the camera 12 in the second candidate region is calculated and saved in the second detection result RES2. Further, in the plane conversion image, a closest point of approach Hb corresponding to the closest point of approach Ha is calculated and similarly output to the second detection result RES2. A method of calculating the closest point of approach Ha and the closest point of approach Hb will be described below using drawings together.

A different record for each labeled second candidate region is registered in the second detection result RES2. For example, when five second candidate regions are labeled, five records are registered in the second detection result RES2. Hereinafter, a kth record of the second detection result RES2 will be denoted as RES2 [k].

(Process Example of Foot Position Calculation Unit)

A description will be given of a process example of the foot position calculation unit with reference to FIG. 12 to FIG. 13.

FIG. 12(a) to FIG. 12(e) are diagrams for description of processing of step S601 to step S604 of FIG. 11. FIG. 12(a) and FIG. 12(b) correspond to the plane conversion image, and FIG. 12(c) to FIG. 12(e) correspond to the overhead image. FIG. 12(a) is the same as FIG. 9(a), and FIG. 12(b) is the same as FIG. 9(b). In addition, FIG. 12(c) is obtained by converting FIG. 12(a) into the overhead image (step S601), and FIG. 12(d) is obtained by converting FIG. 12(b) into the overhead image (step S602).

As illustrated in FIG. 12(a) and FIG. 12(c), the pedestrian X1 in the plane conversion image is converted into a pedestrian X1a in the overhead image. In addition, the parking frame line Y in the plane conversion image is converted into a parking frame line Ya in the overhead image. FIG. 12(b) is an image photographed after time Δt elapses from photographing of FIG. 12(a), and the pedestrian X1 moves to a right side in the figure when compared to FIG. 12(a). Since the vehicle 10 moves during time Δt, the parking frame line Y also moves when FIG. 12(a) is compared with FIG. 12(b). Therefore, the pedestrian X1a and the parking frame line Ya move in FIG. 12(c) to FIG. 12(d) which are overhead images corresponding to FIG. 12(a) to FIG. 12(b).

When FIG. 12(c) is corrected based on the movement amount and the direction of movement of the vehicle 10 during time Δt, and a difference between the corrected FIG. 12(c) and FIG. 12(d) is calculated, FIG. 12(e) is obtained (step S604). In FIG. 12(e), the parking frame line Ya which has not moved disappears due to difference calculation, and only a pedestrian difference region X1b corresponding to a difference of the pedestrian X1a which has moved is illustrated.

FIGS. 13(a) to 13(c) are diagrams for description of a process of calculating the closest point of approach Ha from the calculated second candidate region. In FIG. 13(a), a hatched region denoted by reference symbol X1c is a region in which the pedestrian difference region X1b is determined as the second candidate region through difference grouping (step S605), binarization (step S606), and labeling (step S607).

As illustrated in FIG. 13(a), a camera position C (cx, cy) indicating a position of the camera 12 is set in the overhead image. The camera position C is uniquely determined according to a display range of the overhead image. In an example of FIG. 13(a), it is presumed that the camera position C is installed on a lower side of the overhead image. Here, coordinates of a center of gravity G1 of the region X1c representing the moving body are set to G1 (gx1, gy1).

Subsequently, as illustrated in FIG. 13(b), a line segment L1 connecting the center of gravity G1 (gx1, gy1) and the camera position C (cx, cy) is set. Further, as illustrated in FIG. 13(c) among points belonging to the region X1c, a closest point of approach Ha(hx1, hy1) corresponding to a point closest to the camera position C(cx, cy) is obtained. Specifically, a search is carried out on the line segment L1 from the center of gravity G1(gx1, gy1) toward the camera position C(cx, cy), and an end of the region X1c is set to the closest point of approach Ha. The closest point of approach Ha(hx1, hy1) searched in this way represents a position of a ground point at which the region X1c is in contact with the road surface. Further, the closest point of approach Hb in the plane conversion image corresponding to the calculated closest point of approach Ha is calculated. Conversion from the closest point of approach Ha into the closest point of approach Hb, that is, calculation of coordinates in the planar projected image corresponding to coordinates in the overhead image may be performed in a reverse procedure to that of creation of the overhead image.

As described above, the foot position calculation unit 52 performs the following calculation.

A difference between a plurality of overhead images is calculated, and small regions close to each other among regions having differences are grouped as the second candidate region. A center of gravity of the second candidate region is calculated. Coordinates included in the second candidate region, present on the line segment connecting the center of Gravity and the camera position in the overhead image, and closest to the camera 12 are calculated as the closest point of approach Ha. Further, in the plane conversion image, the closest point of approach Hb corresponding to the closest point of approach Ha is calculated. The coordinates of the center of gravity of the second candidate region and the closest point of approach Ha are registered in the second detection result RES2. The closest point of approach Hb in the planar image corresponding to the closest point of approach Ha calculated from the overhead image is also registered in the second detection result RES2.

(Association Unit)

A description will be given of an operation of the association unit 53 using a flowchart. An execution entity of each step described below corresponds to the CPU of the image processing ECU 18.

Figure 14:
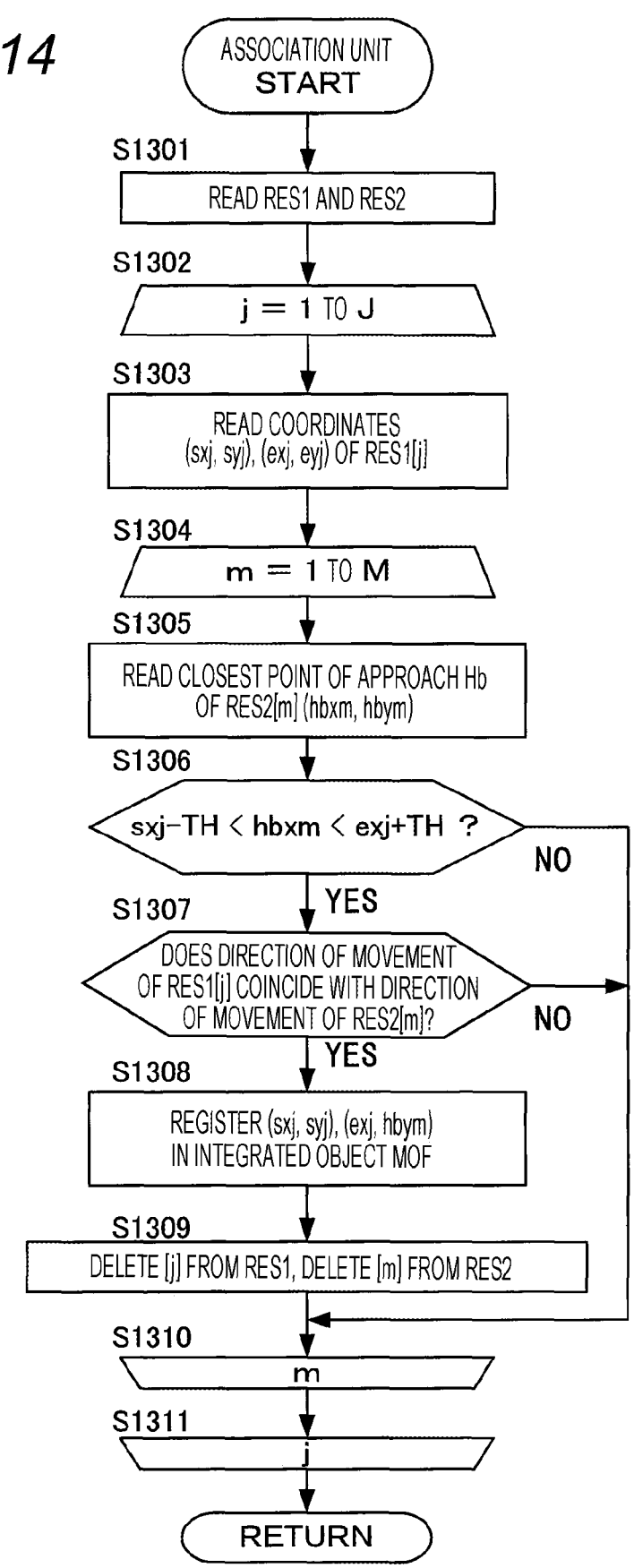
FIG. 14 is a flowchart illustrating an operation of an association unit 53.

FIG. 14 is a flowchart illustrating an operation of the association unit 53.

In step S1301, the first detection result RES1 calculated by the movement vector calculation unit 51 and the second detection result RES2 calculated by the foot position calculation unit 52 are read, and the operation proceeds to step S1302.

In step S1302, an initial value 1 is substituted into a loop counter j, and the operation proceeds to step S1303. When the process advances to step S1311 corresponding to this step, the loop counter j is increased by 1, and the operation proceeds to step S1303 again. This process is repeated until the loop counter reaches J which is the total number of records of the first detection result RES1.

In step S1303, vertex coordinates of the first candidate region in a "j"th record of the first detection result RES1 is read. Hereinafter, top-left coordinates of the first candidate region read in this step will be referred to as (sxj, syj), and bottom-right coordinates thereof will be referred to as (exj, eyj). Subsequently, the operation proceeds to step S1304.

In step S1304, an initial value 1 is substituted into a loop counter "m", and the operation proceeds to step S1305.

In step S1305, coordinates of the closest point of approach Hb in an "m"th record of the second detection result RES2 are read. Hereinafter, the coordinates of the closest point of approach Hb read in this step will be referred to as (hbxm, hbym). Subsequently, the operation proceeds to step S1306.

In step S1306, it is determined whether an X coordinate of the closest point of approach Hb is within a predetermined range. The predetermined range is a range set by the first candidate region read in step S1303 and a predetermined threshold value TH. More specifically, the predetermined range is a range in which an X coordinate (horizontal direction) in the planar projected image is less than a distance TH from a rectangular region. For example, when the X coordinate of the closest point of approach Hb is included in an X coordinate of the first candidate region or when the X coordinate of the closest point of approach Hb is less than the distance TH from an end of the X coordinate of the first candidate region, it is determined that the X coordinate is within the predetermined range. The operation proceeds to step S1307 when it is determined that the X coordinate is within the predetermined range, and the operation proceeds to step S1310 when it is determined that the X coordinate is not within the predetermined range.

In step S1307, it is determined whether a direction of movement of the "j"th record of the first detection result RES1 coincides with a direction of movement of the "m"th record of the second detection result RES2. The operation proceeds to step S1308 when it is determined that the both directions coincide with each other, and the operation proceeds to step S1310 when it is determined that the both directions do not coincide with each other. However, in this specification, a case in which the directions of movement coincide with each other includes not only a case in which the directions of movement strictly coincide with each but also a case in which an angle formed by the two directions of movement is within a predetermined allowable angle.

In step S1308, top-left coordinates of an integrated candidate region having a rectangular shape are set to (sxj, svj), bottom-right coordinates thereof are similarly set to (exj, hbym), and the coordinates are registered in the integrated object MOF. That is, this integrated candidate region is obtained by extending a Y coordinate of the first candidate region in the "j"th record of the first detection result RES1 to a Y coordinate of the closest point of approach Hb in the "m"th record of the second detection result RES2. Subsequently, the operation proceeds to step S1309.

In step S1309, the first candidate region and the second candidate region affirmatively determined in step S1307 are deleted. That is, the "j"th record is deleted from the first detection result RES1, and the "m"th record is deleted from the second detection result RES2. Even though the total number of records of the first detection result RES1 and the second detection result RES2 decreases due to this process, processes of step S1302 and step S1304 are not affected since the total number of records J in step S1302 and the total number of records M in step S1304 are counted when step S1301 is executed. Subsequently, the operation proceeds to step S1310.

Step S1310 corresponds to a loop termination of the loop counter "m". When the loop counter "m" is M, the operation proceeds to step S1311. When the loop counter "m" is not M, the loop counter "m" is increased by 1, and the operation returns to step S1305.

Step S1311 corresponds to a loop termination of the loop counter When the loop counter "j" is J, the flowchart of FIG. 14 is ended. When the loop counter "j" is not J, the loop counter "1" is increased by 1, and the operation returns to step S1303.

(Process Example of Association Unit)

FIG. 15 is a diagram for description of a process example of the association unit 53. FIG. 15(a) is a diagram illustrating three examples indicating success or failure of association, that is, a diagram illustrating a determination example of step S1306 of FIG. 14. FIG. 15(b) is a diagram illustrating a relationship between the first candidate region, the closest point of approach Hb of the second candidate region, and the integrated candidate region, that is, a process example of step S1308.

In FIG. 15(a), reference symbol 1350 denotes the first candidate region, and reference symbols Hb1 to Hb3 denote three points corresponding to comparison targets of the closest point of approach Hb of the second detection region in the front image. An X coordinate of the closest point of approach Hb1 is within a range of the X coordinate of the first candidate region 1350. An X coordinate of the closest point of approach Hb2 is out of the range of the X coordinate of the first candidate region 1350 and within a distance TH from an end of the first candidate region 1350. An X coordinate of the closest point of approach Hb3 is out of the range of the X coordinate of the first candidate region 1350 and away from the end of the first candidate region 1350 by the distance TH or more. In this case, the closest points of approach Hb1 and Hb2 are affirmatively determined in step S1306 of FIG. 14, and the closest point of approach Hb3 is negatively determined in the same step.

In FIG. 15(b), reference symbol 1351 and reference symbol Hb4 denote the closest points of approach Hb of the first candidate region and the second candidate region affirmatively determined in step S1306 and step S130; of FIG. 14. Reference symbol 1352 indicates an integrated region set based on the first candidate region 1351 and the closest point of approach Hb4. However, in FIG. 15(b), in order to avoid overlapping of the first candidate region 1351 and the integrated region 1352, an X coordinate and a Y coordinate of the integrated region 1352 are slightly shifted to sides and illustrated. As illustrated in FIG. 15(b), the integrated region 1352 has a shape obtained by extending a lower side of a rectangle included in the first candidate region 1351 to a Y coordinate of the closest point of approach Hb4. That is, when a rectangular region representing the integrated region 1352 is identified by top-left coordinates and bottom-right coordinates, top-left XY coordinates and a bottom-right X coordinate of the integrated region 1352 coincide with those of the first candidate region 1351, and a bottom-right Y coordinate of the region 1352 coincides with the Y coordinate of the closest point of approach Hb4. Therefore, step S1306 of FIG. 14 is satisfied.

As described above, the association unit 53 performs calculation as follows.

A region obtained by integrating the first candidate region and the second candidate region is calculated based on the first candidate region and the second candidate region. When a horizontal distance between the first candidate region calculated based on the optical flow, that is, the movement vector and the closest point of approach Hb on the planar image corresponding to the closest point of approach Ha of the second candidate region calculated based on the overhead image is within a predetermined range, and the direction of movement of the first candidate region coincides with the direction of movement of the closest point of approach Hb, the first candidate region and the second candidate region are integrated. That is, a vertical lower end of the first candidate region is extended to the closest point of approach Hb of the second candidate region, and this region is set as the integrated candidate region. This integrated candidate region is stored in the integrated object MOF (Operation of Tracking Processing Unit) An operation of the tracking processing unit 55 will be descried using a flowchart. An execution entity of each step described below corresponds to the CPU of the image processing ECU 18.

Figure 16:
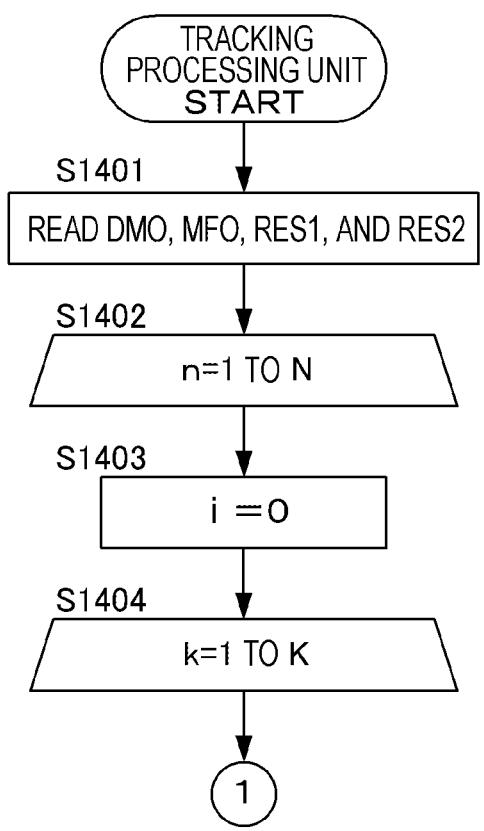
FIG. 16 is a flowchart illustrating an operation of a tracking processing unit 55.
Figure 17:
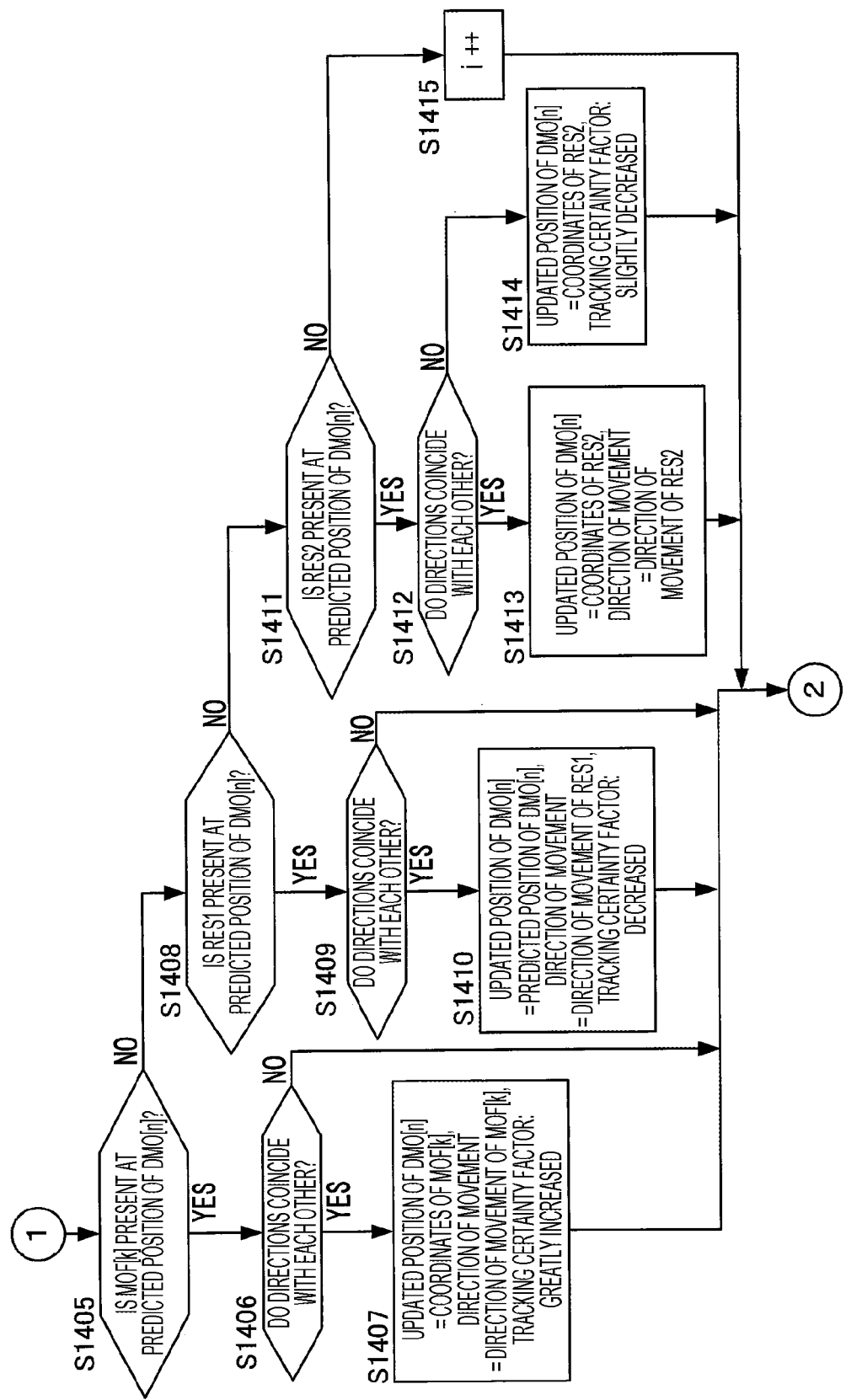
FIG. 17 is a flowchart illustrating an operation of the tracking processing unit 55 continuing from FIG. 16.
Figure 18:
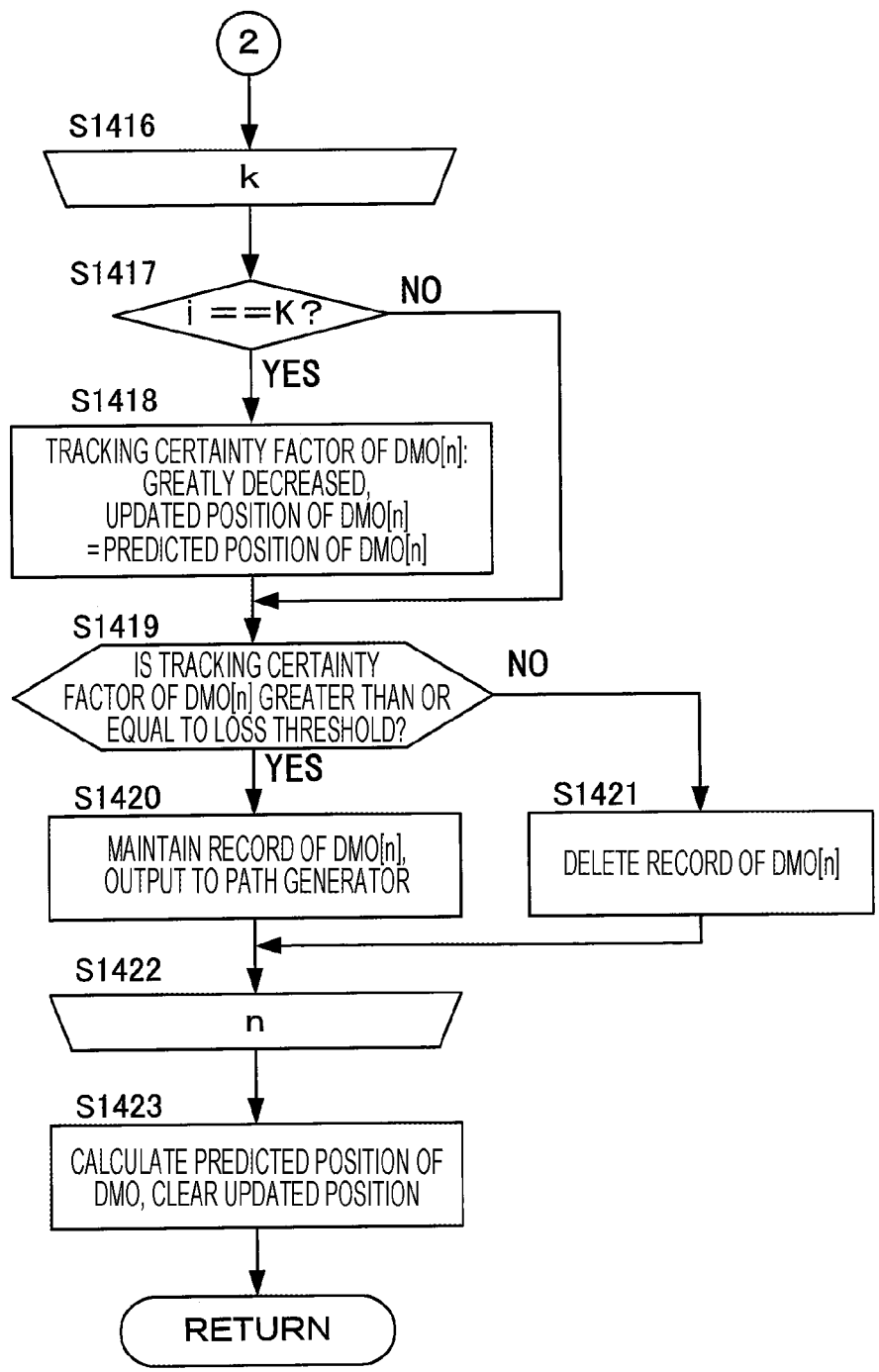
FIG. 18 is a flowchart illustrating an operation of the tracking processing unit 55 continuing from FIG. 17.

FIGS. 16 to 18 correspond to the flowchart illustrating operation of the tracking processing unit 55. Since the total number of steps is large, the flowchart is extended in three drawings.

In step S1401, the tracked moving body DMO is read from the memory 26, the integrated object MOF, the first detection result RES1, and the second detection result RES2 are read from the association unit 53, and the operation proceeds to step S1402.

In step S1402, an initial value 1 is substituted into a loop counter n, and the operation proceeds to step S1403. When the process advances to step S1422 corresponding to this step, a loop counter i is increased by 1, and the operation proceeds to step S1403 again. This process is repeated until the loop counter reaches N corresponding to the total number of records of the tracked moving body DMO.

In step S1403, an initial value 0 is substituted into the counter i, and the operation proceeds to step S1404. The counter i is used to count the number of times corresponding to a condition described below.

In step S1404, an initial value 1 is substituted into a loop counter k, and the operation proceeds to step S1405 illustrated in FIG. 17. When the process advances to step S1416 corresponding to this step, the loop counter k is increased by 1, and the operation proceeds to step S1405 again. This process is repeated until the loop counter reaches K corresponding to the total number of records of the integrated object MOF.

In step S1405 of FIG. 17, it is determined whether an integrated candidate region recorded in a "k"th record in the integrated object MOF is present at a predicted position of the moving body recorded in an "n"th record in the tracked moving body DMO. In other words, it is determined whether coordinates of the "k"th record in the integrated object MOF are included in the predicted position of the "n"th record in the tracked moving body DMO. The operation proceeds to step S1406 when it is determined that the coordinates are included, and the operation proceeds to step S1408 when it is determined that the coordinates are not included. The predicted position of the moving body read in this step is calculated in step S1423 described below when the tracking processing unit 55 is executed immediately before.

In step S1406, it is determined whether a direction of movement of the "n"th record in the tracked moving body DMO coincides with a direction of movement of the "k"th record in the integrated object MOF. The operation proceeds to step S1407 when it is determined that the directions coincide with each other, and the operation proceeds to step S1416 of FIG. 18 when it is determined that the directions do not coincide with each other.

In step S1407, an updated position, the direction of movement, and a tracking certainty factor of the "n"th record in the tracked moving body DMO are changed as below. That is, coordinates of the "k"th record in the integrated object MOF are substituted into the updated position, the direction of movement of the "k"th record in the integrated object MOF is substituted into the direction of movement, and the tracking certainty factor is greatly increased, for example, increased by 20. Subsequently, the operation proceeds to step S1416 of FIG. 18.

In step S1408 executed when negative determination is made in step S1405, it is determined whether the first candidate region of the first detection result RES1 is present at the predicted position of the moving body recorded in the "n"th record in the tracked moving body DMO. In other words, it is determined whether coordinates of any one of the first candidate regions are included in the predicted position of the "n"th record in the tracked moving body DMO. The operation proceeds to step S1409 when it is determined that any one of the first candidate regions is included, and the operation proceeds to step S1411 when it is determined that any first candidate region is not included. In description of the operation of the tracking processing unit 55 below, a first candidate region whose coordinates are determined to be included in the predicted position in this step will be referred to as a specific first candidate region.

In step S1409, it is determined whether the direction of movement of the "n"th record in the tracked moving body DMO coincides with a direction of movement of the specific first candidate region. The operation proceeds to step S1410 when it is determined that the directions of movement coincide with each other, and the operation proceeds to step S1416 of FIG. 18 when it is determined that directions of movement do not coincide with each other.

In step S1410, the updated position, the direction of movement, and the tracking certainty factor of the "n"th record in the tracked moving body DMO are changed as below. That is, the predicted position of the moving body in the same record is substituted into the updated position, the direction of movement of the specific first candidate region is substituted into the direction of movement, and the tracking certainty factor is decreased, for example, decreased by 10. Subsequently, the operation proceeds to step S1416 of FIG. 18.

In step S1411 executed when negative determination is made in step S1408, it is determined whether the closest point of approach Hb of the second detection result RES2 is present at the predicted position of the moving body recorded in the "n"th record in the tracked moving body DMO. In other words, it is determined whether the closest point of approach Hb of any one of the second detection results RES2 is included in the predicted position of the "n"th record in the tracked moving body DMO. The operation proceeds to step S1412 when it is determined that any one of the closest points of approach Hb is included, and the operation proceeds to step S1415 when it is determined that any closest point of approach Hb is not included. In description of the operation of the tracking processing unit 55 below, a second candidate region whose closest point of approach Hb is determined to be included in the predicted position in this step will be referred to as a specific second candidate region.

In step S1412, it is determined whether the direction of movement of the "n"th record in the tracked moving body DMO coincides with a direction of movement of the specific second candidate region. The operation proceeds to step S1413 when it is determined that the directions of movement coincide with each other, and the operation proceeds to step S1414 when it is determined that the directions of movement do not coincide with each other.

In step S1413, the updated position and the direction of movement of the "n"th record in the tracked moving body DMO are changed as below. That is, coordinates of the closest point of approach Hb of the specific second candidate region are substituted into the updated position, and the direction of movement of the specific second candidate region is substituted into the direction of movement. Subsequently, the operation proceeds to step S1416 of FIG. 18.

In step S1414, the updated position and the tracking certainty factor of the "n"th record in the tracked moving body DMO are changed as below. That is, coordinates of the closest point of approach Hb of the specific second candidate region are substituted into the updated position, and the tracking certainty factor is slightly decreased, for example, decreased by 5. Subsequently, the operation proceeds to step S1416 of FIG. 18.

In step S1415 executed when negative determination is made in all the steps S1405, S1408, and S1411, the counter i is incremented, that is, i is increased by 1, and the operation proceeds to step S1416 of FIG. 18.

Step S1416 of FIG. 18 corresponds to a loop termination of the loop counter k. The operation proceeds to step S1417 when the loop counter k is K, and the loop counter k is increased by 1 and the operation returns to step S1405 of FIG. 17 when loop counter is not K.

In step S1417, it is determined whether the counter i is equal to K corresponding to the total number of records of the integrated object MOF. The operation proceeds to step S1418 when it is determined that the counter i is equal to K, and the operation proceeds to step S1419 when it is determined that the counter i is not equal to K.

In step S1418, the tracking certainty factor of the "n"th record in the tracked moving body DMO is greatly decreased, that is, decreased by 20, and the predicted position of the moving body of the same record is substituted into the updated position. Subsequently, the operation proceeds to step S1419.

In step S1419, it is determined whether the tracking certainty factor of the "n"th record in the tracked moving body DMO corresponds to a loss threshold, for example, zero or more. The operation proceeds to step S1420 when it is determined that the tracking certainty factor is greater than or equal to the loss threshold, and the operation proceeds to step S1421 when it is determined that the tracking certainty factor is less than the loss threshold.

In step S1420, it is determined not to delete the "n"th record in the tracked moving body DMO, and the updated position which is an identified position of the moving body, the direction of movement, and the speed corresponding to information about the record are output as moving body information to the path generator 17. Subsequently, the operation proceeds to step S1422.

In step S1421, the "n"th record in the tracked moving body DMO is deleted, and the operation proceeds to step S1422.

Step S1422 corresponds to a loop termination of the loop counter n. The operation proceeds to step S1423 when the loop counter n is N, and the loop counter n is increased by 1 and the operation returns to step S1403 of FIG. 16 when the loop counter n is not N.

In step S1423, a new predicted position is calculated based on a speed, a direction of movement, and an updated position of each record with respect to all records of the tracked moving body DMO. The calculated predicted position is recorded in the tracked moving body DMO, the updated position of each record is cleared, that deleted, and the program represented by the flowchart of FIG. 16 to FIG. 18 is ended.

(Summary of Process of Tracking Processing Unit)

FIG. 19 illustrates update of the updated position, direction of movement, and the tracking certainty factor of the tracked moving body DMO by the operation of the tracking processing unit 55 described with reference to FIG. 16 to FIG. 18.

FIG. 19 is a table illustrating a process of updating the tracked moving body DMO by the tracking processing unit 55. FIG. 19 illustrates that a corresponding process is performed when a predetermined condition is satisfied.

"Coincidence of coordinates" in a "condition" column indicates that a predicted position in a certain record of the tracked moving body DMO coincides with coordinates of the integrated candidate region, the first candidate region, and the second candidate region or coincides with coordinates of neither of the regions. "Direction of movement" in a "condition" column indicates whether a direction of movement in a certain record of the tracked moving body DMO coincides with a direction of movement of the integrated candidate region, the first candidate region, or the second candidate region having coinciding coordinates.

"Updated position", "direction of movement", and "tracking certainty factor" in a "process" column indicate a process of updating each value of a moving body candidate region in a certain record of the tracked moving body DMO.

As described above, the tracking processing unit 55 performs calculation as below.

The tracking processing unit 55 reads the integrated object MOF, the first detection result RES1, the first detection result RES1, and the tracked moving body DMO. The tracking processing unit 55 updates the position of the moving body stored in the tracked moving body DMO, that is, identifies the position of the moving body, deletes the moving body from the tracking target, that is, deletes a specific record from the tracked moving body DMO, outputs information related to the moving body to the path generator 17, and changes the tracking certainty factor. when the tracking certainty factor becomes less than or equal to a predetermined value, deletion from the tracked moving body DMO is performed.

(Operation of Tracked Moving Body Confirmation Unit)

A description will be given of an operation of an operation of the tracked moving body confirmation unit 54 using a flowchart. An execution entity of each step described below corresponds to the CPU of the image processing ECU 18.

Figure 20:
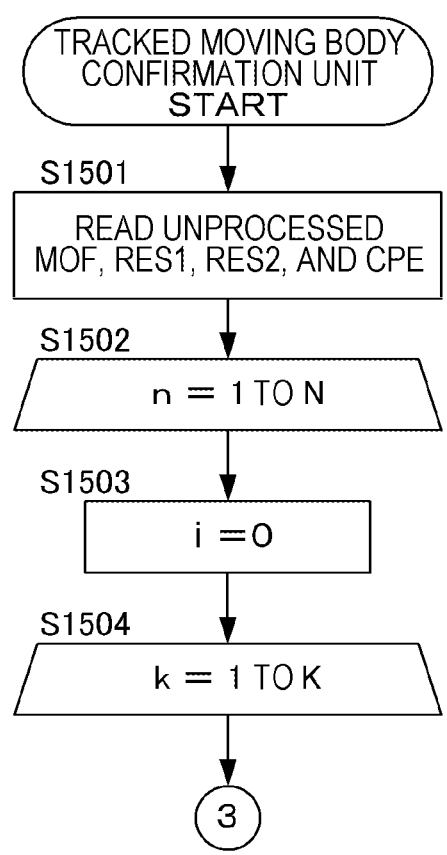
FIG. 20 is a flowchart illustrating an operation of a tracked moving body confirmation unit 54.
Figure 21:
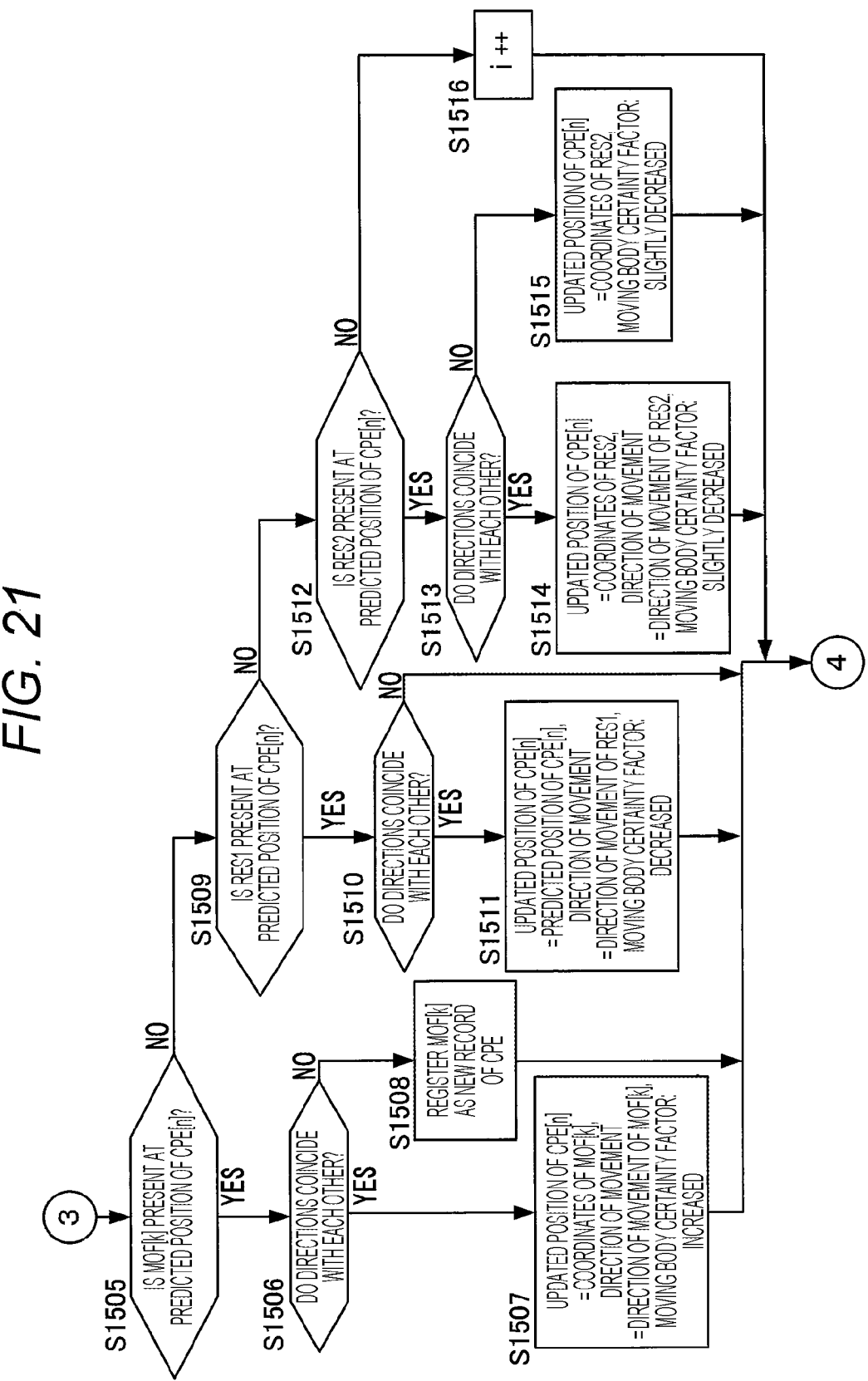
FIG. 21 is a flowchart illustrating an operation of the tracked moving body confirmation unit 54 continuing from FIG. 20.
Figure 22:
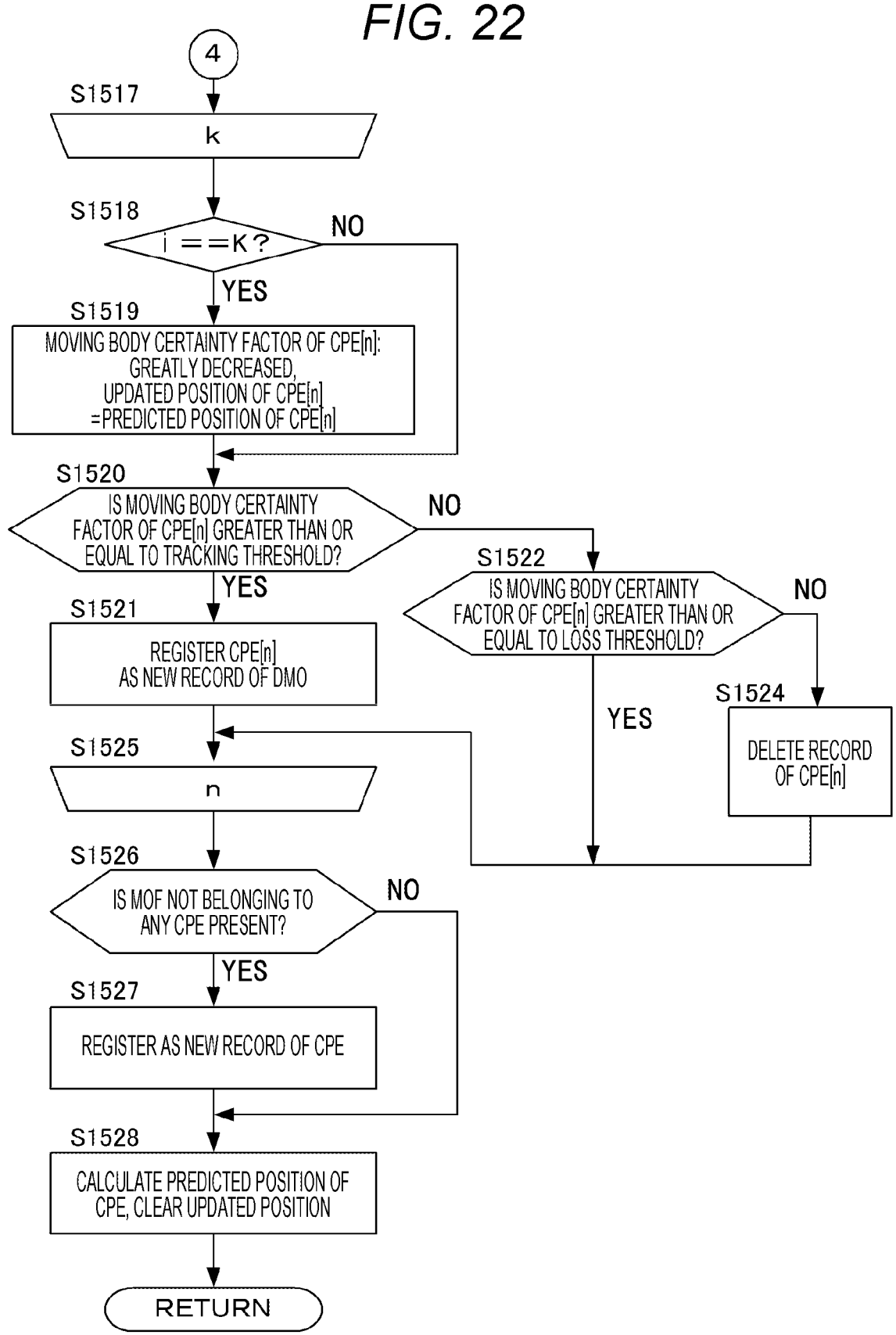
FIG. 22 is a flowchart illustrating an operation of the tracked moving body confirmation unit 54 continuing from FIG. 21.

FIGS. 20 to 22 are flowcharts illustrating the operation of the tracked moving body confirmation unit 54. Since the total number of steps is large, the flowchart is extended in three drawings.

In step S1501, the moving body candidate CPE is read from the memory 26, and the integrated object MOF, the first detection result RES1, and the second detection result RES2 are read from the tracked moving body DMO. The operation proceeds to step S1502.

In step S1502, an initial value 1 is substituted into the loop counter n, and the operation proceeds to step S1503. When the operation proceeds to step S1525 corresponding to this step, the loop counter i is increased by 1, and the operation proceeds to step S1503 again. This process is repeated until the loop counter reaches N corresponding to the total number of records of the moving body candidate CPE.

In step S1503, an initial value 0 is substituted into the counter i, and the operation proceeds to step S1504.

In step S1504, an initial value 1 is substituted into the loop counter k, and the operation proceeds to step S1505 illustrated in FIG. 21. When the operation proceeds to step S1517 corresponding to this step, the loop counter k is increased by 1, and the operation proceeds to step S1505 again. This process is repeated until the loop counter reaches K corresponding to the total number of records of the integrated object MOF.

In step S1505 of FIG. 21, it is determined whether the integrated candidate region recorded in the "k"th record in the integrated object MOF is present at the predicted position of the moving body recorded in the "n"th record in the moving body candidate CPE. In other words, it is determined whether coordinates of the "k"th record in the integrated object MOF are present at a predicted position of any one of "n"th records in the moving body candidate CPE. The operation proceeds to step S1506 when it is determined that the coordinates are included, and the operation proceeds to step S1509 when it is determined that the coordinates are not included. The predicted position of the moving body read in this step is calculated in step S1528 described below when the tracked moving body confirmation unit 54 is executed immediately before.

In step S1506, it is determined whether a direction of movement of the "n"th record in the moving body candidate CPE coincides with a direction of movement of the "k"th record in the integrated object MOF. The operation proceeds to step S1507 when it is determined that the directions coincide with each other, and the operation proceeds to step S1508 when it is determined that the directions do not coincide with each other.

In step S1507, an updated position, the direction of movement, and a moving body certainty factor of the "n"th record in the moving body candidate CPE are changed as below. That is, coordinates of the "k"th record in the integrated object MOF are substituted into the updated position, the direction of movement of the "k"th record in the integrated object MOF is substituted into the direction of movement, and the moving body certainty factor is increased, for example, increased by 10. Subsequently, the operation proceeds to step S1517 of FIG. 22.

In step S1508, the "k"th record in the integrated object MOF is registered as a new record of the moving body candidate CPE. In this instance, the moving body certainty factor is set to a predetermined value, for example, 50. In addition, a predicted position of an added record is left blank, and an updated position of the added record is set to coordinates of the "k"th record in the integrated object MOF.

The predicted position is calculated by a process described below. Subsequently, the operation proceeds to step S1517 of FIG. 22.

In step S1509 executed when negative determination is made in step S1505, it is determined whether the first candidate region of the first detection result RES1 is present at any one of predicted positions recorded in the "n"th record in the moving body candidate CPE. In other words, it is determined whether coordinates of any one of the first candidate regions are included in any one of the predicted positions of the "n"th record in the moving body candidate CPE. The operation proceeds to step S1510 when it is determined that anyone of the first candidate regions is included, and the operation proceeds to step S1512 when it is determined that any first candidate region is not included. In description of the operation of the tracked moving body confirmation unit 54 below, a first candidate region whose coordinates are determined to be included in the predicted position in this step will be referred to as a specific first candidate region.

In step S1510, it is determined whether the direction of movement of the "n"th record in the moving body candidate CPE coincides with a direction of movement of the specific first candidate region. The operation proceeds to step S1511 when it is determined that the directions of movement coincide with each other, and the operation proceeds to step S1517 of FIG. 22 when it is determined that the directions of movement do not coincide with each other.

In step S1511, the updated position, the direction of movement, and the moving body certainty factor of the "n"th record in the moving body candidate CPE are changed as below. That is, the predicted position of the "n"th record in the moving body candidate CPE is substituted into the updated position, the direction of movement of the specific first candidate region is substituted into the direction of movement, and the moving body certainty factor is decreased, for example, decreased by 10. However, the predicted position substituted into the updated position is set as a predicted position having a shortest distance to the specific first candidate region among a plurality of predicted positions stored in the same record. Subsequently, the operation proceeds to step S1517 of FIG. 22.

In step S1512 executed when negative determination is made in step S1509, it is determined whether the closest point of approach Hb of the second detection result RES2 is present at the predicted position of the moving body recorded in the "n"th record in the moving body candidate CPE. In other words, it is determined whether the closest point of approach Hb of any one of the second detection results RES2 is included in the predicted position of the "n"th record in the moving body candidate CPE. The operation proceeds to step S1513 when it is determined that any one of the closest points of approach Hb is included, and the operation proceeds to step S1516 when it is determined that any closest point of approach Hb is not included. In description of the operation of the tracked moving body confirmation unit 54 below, a second candidate region whose closest point of approach Hb is determined to be included in the predicted position in this step will be referred to as a specific second candidate region.

In step S1513, it is determined whether the direction of movement of the "n"th record in the moving body candidate CPE coincides with the direction of movement of the specific second candidate region. The operation proceeds to step S1514 when it is determined that the directions of movement coincide with each other, and the operation proceeds to step S1515 when it is determined that the directions of movement do not coincide with each other.

In step S1514, the updated position, the direction of movement, and the moving body certainty factor of the "n"th record in the moving body candidate CPE are changed as below. That is, the closest point of approach Hb of the specific second candidate region is substituted into the updated position, the direction of movement of the specific second candidate region is substituted into the direction of movement, and the moving body certainty factor is slightly decreased, for example, decreased by 5. Subsequently, the operation proceeds to step S1517 of FIG. 22.

In step S1515, the updated position and the moving body certainty factor of the "n"th record in the moving body candidate CPE are changed as below. That is, the closest point of approach Hb of the specific second candidate region is substituted into the updated position, and the moving body certainty factor is slightly decreased, for example, decreased by 5. Subsequently, the operation proceeds to step S1517 of FIG. 22.

In step S1516 executed when negative determination is made in all the steps S1505, S1509, and S1512, the counter i is incremented, that is, i is increased by 1, and the operation proceeds to step S1517 of FIG. 22.

Step S1517 of FIG. 22 corresponds to a loop termination of the loop counter k. The operation proceeds to step S1518 when the loop counter k is K, and the loop counter k is increased by 1 and the operation returns to step S1505 of FIG. 21 when the loop counter is not K.

In step S1518, it is determined whether the counter i is equal to K corresponding to the total number of records of the integrated object MOF. The operation proceeds to step S1519 when it is determined that the counter i is equal to K, and the operation proceeds to step S1520 when it is determined that the counter i is not equal to K.

In step S1519, the moving body certainty factor of the "n"th record in the moving body candidate CPE is greatly decreased, for example, decreased by 20, and the predicted position of the moving body candidate region is substituted into the same record of the updated position. The moving body candidate region has a plurality of candidates for the predicted position, and a predicted position having a shortest distance among the candidates is substituted into the updated position. Subsequently, the operation proceeds to step S1520.

In step S1520, it is determined whether the moving body certainty factor of the "n"th record in the moving body candidate CPE is greater than or equal to a tracking threshold, for example, 100. The operation proceeds to step S1521 when it is determined that the moving body certainty factor is greater than or equal to the tracking threshold, and the operation proceeds to step S1522 when it is determined that the moving body certainty factor is less than the tracking threshold.

In step S1521, the "n"th record in the moving body candidate CPE is registered as a new record of the tracked moving body DMO. In this instance, the tracking certainty factor is set to a predetermined value, for example, 50. In addition, a predicted position of an added record is left blank, and an updated position of the added record is set to a predicted position of the "n"th record in the moving body candidate CPE. The predicted position of the added record is calculated by a process described below. Subsequently, the operation proceeds to step S1525.

In step S1522, it is determined whether the moving body certainty factor of the "n"th record in the moving body candidate CPE is greater than or equal to the loss threshold, for example, zero. The operation proceeds to step S1525 when it is determined that the moving body certainty factor is greater than or equal to the loss threshold, and the operation proceeds to step S1524 when it is determined that the moving body certainty factor is less than the loss threshold.

In step S1524, the "n"th record in the moving body candidate CPE is deleted, and the operation proceeds to step S1525.

Step S1525 corresponds to a loop termination of the loop counter n. The operation proceeds to step S1526 when the loop counter n is N, and the loop counter n is increased by 1 and the operation returns to step S1503 of FIG. 20 when the loop counter n is not N.

In step S1526, it determined whether an integrated object MOF not belonging to any one of moving body candidates CPE is present. In other words, it is determined whether a record (hereinafter referred to as "all negative determination record") of the integrated object MOF for which affirmative determination is not made in step S1505 is present for any one of records 1 to N of the moving body candidate CPE. The operation proceeds to step S1527 when it is determined that the all negative determination record is present, and the operation proceeds to step S1528 when it is determined that the all negative determination record is not present.

In step S1527, the all negative determination record is registered as a new record of the moving body candidate CPE. In this instance, the moving body certainty factor is set to a predetermined value, for example, 50. In addition, a predicted position of an added record is left blank, and an updated position of the added record is set to coordinates of the all negative determination record. Subsequently, the operation proceeds to step S1528.

In step S1528, for all the records of the moving body candidate CPE, a plurality of new predicted positions is calculated based on a direction of movement, an updated position, and a plurality of predetermined speeds of each record. For example, the plurality of predetermined speeds refers to speeds corresponding to walking, jogging, and a sprint. The calculated predicted position is recorded in each record of the moving body candidate CPE, the updated position of each record is cleared, that is, deleted, and a program expressed by the flowchart of FIG. 20 to FIG. 22 is ended.

(Summary of Process of Tracked Moving Body Confirmation Unit)

FIG. 23 illustrates update of the updated position, direction of movement, and the moving body certainty factor of the moving body candidate CPE by the operation of the tracked moving body confirmation unit 54 described with reference to FIG. 20 to FIG. 22.

FIG. 23 is a table illustrating a process of updating the moving body candidate CPE by the tracked moving body confirmation unit 54. FIG. 23 illustrates that a corresponding process is performed when a predetermined condition is satisfied.

"Coincidence of coordinates" in a "condition" column indicates that a predicted position of a moving body candidate region recorded in a certain record of the moving body candidate CPE coincides with coordinates of the integrated candidate region, the first candidate region, and the second candidate region or coincides with coordinates of neither of the regions. "Direction of movement" in a "condition" column indicates whether a direction of movement in a certain record of the moving body candidate CPE coincides with a direction of movement of the integrated candidate region, the first candidate region, or the second candidate region having coinciding coordinates.

"Updated position", "direction of movement", and "moving body certainty factor" in a "process" column indicate a process of updating each value of a moving body candidate region in a certain record of the moving body candidate CPE. However, when coordinates coincide and the direction of movement does not coincide with those of the integrated candidate region, the integrated candidate region is added to the tracked moving body DMO.

As described above, the tracked moving body confirmation unit 54 performs calculation as below.

The tracked moving body confirmation unit 54 reads the integrated object MOF, the first detection result REST, the second detection result RES2, and the moving body candidate CPE. The tracked moving body confirmation unit 54 adds or deletes a record to or from the moving body candidate CPE, adds a record satisfying a criterion described below to the tracked moving body DMO, and increases/decreases a moving body certainty factor described below. A record is deleted from the moving body candidate CPE when the moving body certainty factor becomes 0 or less, and the record is moved from the moving body candidate CPE to the tracked moving body DMO when the moving body certainty factor exceeds 100.

The tracking device of the embodiment described above includes the movement vector calculation unit 51 that calculates the first candidate region from the photographed image, the foot position calculation unit 52 that calculates the second candidate region from the overhead image, the association unit 53 that calculates the integrated candidate region in which the first candidate region and the second candidate region are associated with each other, the tracking processing unit 55 that tracks the moving body corresponding to the tracking target based on the first and second candidate regions and the integrated candidate region, and the tracked moving body confirmation unit 54 that confirms the moving body used as the tracking target.

The first candidate region, the second candidate region, and the integrated candidate region are calculated each time the photographed image is input. Meanwhile, the moving body candidate CPE and the tracked moving body DMO are stored in the memory 26 and updated by the tracked moving body confirmation unit 54 or the tracking processing unit 55 each time the photographed image is input.

(Path Generator)

The path generator 17 calculates the moving path of the vehicle 10 based on moving body information output by the tracking processing unit 55. The calculated moving path is displayed on the monitor 34 via the display controller 32. However, the vehicle behavior control ECU 30 may prevent collision by controlling the brake actuator 36 based on an output of the path generator 17.

The moving body information output by the tracking processing unit 55 includes a position, a direction of movement, and a speed of the moving body. The path generator 17 calculates a moving path for avoiding collision with the moving body. However, when a moving path for avoiding collision may not be calculated, the path generator 17 outputs a stop instruction to the display controller 32.

Figure 24:
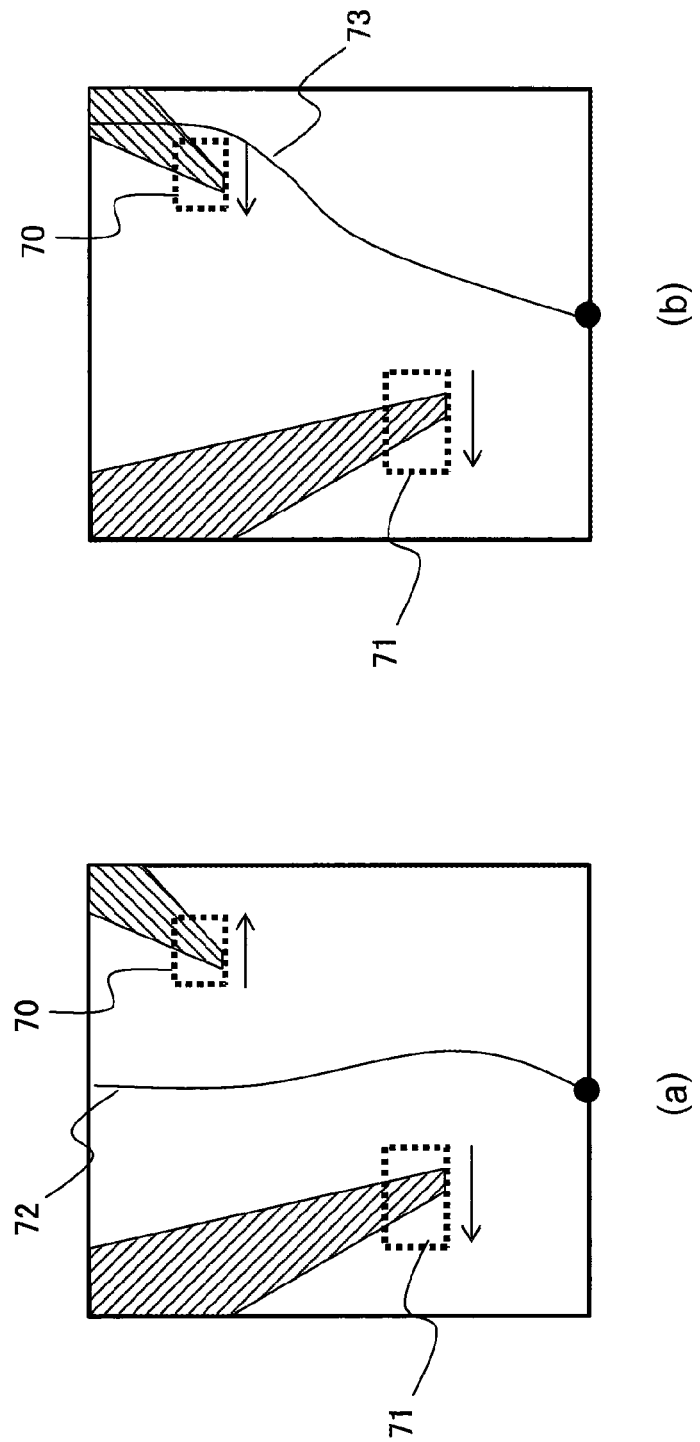
FIG. 24 is a diagram illustrating a path generated by a path generator 17, FIG. 24(a) corresponds to a case in which a vehicle on a right front side of the vehicle 10 moves to a right side in the figure, and FIG. 24(b) corresponds to a case in which the vehicle on the right front side of the vehicle 10 moves to a left side in the figure.

(Operation Example of Path Generator) FIG. 24 is a diagram illustrating a state in which the path generator 17 generates a path based on the moving body information output by the tracking processing unit 55. A moving body 70 is present on the left front side of the vehicle 10, and a moving body 71 is present on the right front side of the vehicle 10, which is a common point between FIGS. 24(a) and 24(b).

In FIG. 24(a), the moving body 70 positioned on the left front side of the vehicle 10 moves to the left side in the figure, and the moving body 71 positioned on the right front side of the vehicle 10 moves to the right side in the figure. The path generator 17 receiving the moving body information from the tracking processing unit 55 generates a path 72 traveling between the moving body 70 and the moving body 71, that is, traveling substantially straight therebetween.

In FIG. 24(b), the moving body 70 positioned on the left front side of the vehicle 10 and the moving body 71 positioned on the right front side of the vehicle 10 move to the left side in the figure. The path generator 17 receiving the moving body information from the tracking processing unit 55 generates a path 73 largely bulging to the right side in the figure to travel around a space between the moving body 70 and the moving body 71.

According to the first embodiment described above, the following effects are obtained.

(1) The tracking device, that is, the image processing ECU 18 includes an imaging unit, that is, an image input unit to which an image photographed by the camera 12 is input, that is, the communication unit 18a, a first moving body detection unit, that is, the movement vector calculation unit 51 that calculates the optical flow using the plurality of images input to the image input unit and detects the position and the direction of movement of the moving body based on the calculated optical flow, a second moving body detection unit, that is, the foot position calculation unit 52 that detects the position and the direction of movement of the moving body based on the plurality of overhead images generated based on the plurality of images, a third moving body detection unit, that is, the association unit 53 that integrates the detection results from the first moving body detection unit and the second moving body detection unit and detects the position and the direction of movement of the moving body, the tracked moving body confirmation unit 54 that determines the moving body to be tracked based on the detection results from the first to third moving body detection units, the estimation unit 55a that estimates the future position and direction of movement of the tracked moving body determined by the tracked moving body confirmation unit 54, and the tracking unit 55b that tracks the tracked moving body and identifies the position of the tracked moving body using one of each position of the moving body detected by each of the first to third moving body detection units and the estimated position estimated by the estimation unit 55a.

Since the image processing ECU 18 is configured in this way, even when detection of the first candidate region using the optical flow by the movement vector calculation unit 51 and detection of the second candidate region using the overhead image by the foot position calculation unit 52 are not allowed, tracking of the moving body by the tracking processing unit 55 can be continued. Therefore, tracking of the moving body is easily continued.

(2) The second moving body detection unit, that is, the foot position calculation unit 52 calculates a difference region corresponding to a difference between the plurality of overhead images and a center of gravity G of the difference region, and detects, as a moving body, a point included in the difference region and closest to a position C of the imaging unit in an overhead image on a line segment L1 connecting the center of gravity G of the difference region and the position C of the imaging unit.

For this reason, a foot position of the moving body difficult to calculate in the optical flow may be accurately detected.

(3) When a horizontal distance between the position of the moving body detected by the first moving body detection unit and the position of the moving body detected by the second moving body detection unit is within a predetermined range, and the direction of movement of the moving body detected by the first moving body detection unit coincides with the direction of movement of the moving body detected by the second moving body detection unit, the third moving body detection unit, that is, the association unit 53 integrates the moving body detected by the first moving body detection unit with the moving body detected by the second moving body detection unit.

For this reason, it is possible to accurately integrate a moving body detection result based on an optical flow which easily detects the moving body and has high accuracy in the horizontal direction with a moving body detection result based on an overhead image having high accuracy in detection of a foot position using two conditions of a position and a direction of movement.

(4) The positions of the moving body detected by the first moving body detection unit, that is, the movement vector calculation unit 51 and the third moving body detection unit, that is, the association unit 53 correspond to a region that horizontally and vertically spreads. The third moving body detection unit sets a region obtained by extending a vertical lower end of a region of the integrated moving body detected by the first moving body detection unit to a vertical lower end of the integrated moving body detected by the second moving body detection unit as the position of the moving body detected by the third moving body detection unit.

For this reason, a region detected by the movement vector calculation unit 51 in which accuracy in the horizontal direction is high is extended to the closest point of approach Hb calculated by the foot position calculation unit 52 at which accuracy of the foot position is high, and thus it is possible to accurately detect the region of the moving body.

(5) The tracked moving body confirmation unit 54 stores a moving body certainty factor corresponding to an index indicating a probability of determining a moving body candidate corresponding to a candidate for the tracked moving body as a tracking target, and estimates a future position of the moving body candidate. Further, the tracked moving body confirmation unit 54 increases or decreases the moving body certainty factor based on a relationship between the future position of the moving body candidate estimated by the tracked moving body confirmation unit 54, and the position of the moving body detected by the third moving body detection unit, the position of the moving body detected by the first moving body detection unit, and the position of the moving body detected by the second moving body detection unit to determine the moving body candidate as a new tracked moving body when the moving body certainty factor is greater than or equal to a predetermined value.

For this reason, when the moving body certainty factor of the moving body candidate region is greater than or equal to a predetermined threshold value, the moving body candidate region may be determined as a new moving body tracked by the tracking processing unit 55, and thus a moving body candidate region having a high probability may be newly set as a tracking target.

(6) The tracking unit 55b of the tracking processing unit 55 sets the position of the moving body detected by the third moving body detection unit as a tracked position of the tracked moving body when a distance between the future position of the tracked moving body estimated by the estimation unit 55a and the position of the moving body detected by the third moving body detection unit is less than a predetermined distance, and the future direction of movement of the tracked moving body estimated by the estimation unit 55a coincides with the direction of movement of the moving body detected by the third moving body detection unit. The tracking unit 55b sets the estimated position estimated by the estimation unit 55a as a tracked position of the tracked moving body when a distance between the future position of the tracked moving body estimated by the estimation unit 55a and the position of the moving body detected by the third moving body detection unit is greater than or equal to a predetermined distance, a distance between the future position of the tracked moving body estimated by the estimation unit 55a and the position of the moving body detected by the first moving body detection unit is less than a predetermined distance, and the future direction of movement of the tracked moving body estimated by the estimation unit 55a coincides with the direction of movement of the moving body detected by the second moving body detection unit. The tracking unit 55b sets the position of the moving body detected by the second moving body detection unit as a tracked position of the tracked moving body when a distance between the future position of the tracked moving body estimated by the estimation unit 55a and the position of the moving body detected by the third moving body detection unit is greater than or equal to a predetermined distance, a distance between the future position of the tracked moving body estimated by the estimation unit 55a and the position of the moving body detected by the first moving body detection unit is greater than or equal to a predetermined distance, and a distance between the future position of the tracked moving body estimated by the estimation unit 55a and the position of the moving body detected by the second moving body detection unit is less than a predetermined distance.

For this reason, the moving body may be tracked by comparing the position and the direction of movement of the moving body and the position of the tracked moving body estimated by the tracking processing unit 55 with the positions and the directions of movement of the moving body detected by the movement vector calculation unit 51, the foot position calculation unit 52, and the association unit 53.

(7) The tracking unit 55b stores a tracking certainty factor corresponding to an index indicating a probability of tracking of the tracked moving body with respect to each tracked moving body, and increases or decreases the tracking certainty factor based on a relationship between the future position of the tracked moving body estimated by the estimation unit, and the position of the moving body detected by the third moving body detection unit, the position of the moving body detected by the first moving body detection unit, and the position of the moving body detected by the second moving body detection unit to exclude the tracked moving body from an object of tracking when the tracking certainty factor is less than or equal to a predetermined value.

For this reason, along with a tracking process of updating the position of the moving body, the tracking certainty factor is increased or decreased to exclude a moving body from an object of tracking when the tracking certainty factor is less than or equal to a predetermined threshold value, and thus it is possible to reduce a processing load of tracking a moving body having a low probability. In addition, it is possible to ensure a probability of tracking of a moving body tracked by the tracking processing unit 55 to a certain level or more.

(Modification 1) In the above-described embodiment, the tracking processing unit 55 saves the speed of the moving body in the tracked moving body DMO on the assumption that the moving body moves in uniform motion. However, the tracking processing unit 55 may calculate movement of the moving body using the Kalman filter, and save a parameter thereof in the tracked moving body DMO.

According to Modification 1, it is possible to accurately estimate movement of the moving body.

In the above description, the embodiment and the modification have been described. However, the invention is not limited to contents thereof. Other embodiments considered within the technical idea of the invention are included in the scope of the invention.

The disclosure content of the following priority application is incorporated herein as reference.

Japanese Patent Application No. 2015-237513 (filed on Dec. 4, 2015)

REFERENCE SIGNS LIST 10 vehicle
12 camera
17 path generator
18 image processing ECU
18a communication unit
26 memory
30 vehicle behavior control ECU
51 movement vector calculation unit
52 foot position calculation unit
53 association unit
54 tracked moving body confirmation unit
55 tracking processing unit
55a estimation unit
55b tracking unit
CPE moving body candidate
DMO tracked moving body
ECU image processing
MOF integrated object
RES1 first detection result
RES2 second detection result

The invention claimed is:
1. A tracking device comprising:
   a memory;
   a camera; and
   a processor, the processor communicatively coupled to the memory and camera, wherein the processor is configured to:
   calculate an optical flow using a plurality of images from the camera,
   detect a first set of detection results including at least a position and a direction of movement of a moving body based on the calculated optical flow,
   detect a second set of detection results including at least a position and a direction of movement of the moving body based on a plurality of overhead images generated based on the plurality of images,
   detect a third set of detection results including at least a position and a direction of movement of the moving body by integrating the first set of detection results and the second set of detection results,
   determine a moving body to be tracked based on the first set of detection results and the second set of detection results and the third set of detection results, estimate a future position and direction of movement of the tracked moving body, track the tracked moving body and identify a position of the tracked moving body using any one of the respective positions of the moving body detected in the second set of detection results and the third set of detection results and the estimated future position, calculate a difference region corresponding to a difference between two sequential overhead images of the plurality of overhead images, calculate a center of gravity of the difference region, and detect, as the moving body, a point included in the difference region and closest to a position of the camera on a line segment connecting the center of gravity of the difference region and the position of the camera.

2. The tracking device according to claim 1, wherein when a horizontal distance between the position of the moving body in the first set of detection results and the position of the moving body in the second set of detection results is within a predetermined range, and the direction of movement of the moving body in the first set of detection results coincides with the direction of movement of the moving body in the second set of detection results, the processor integrates the moving body in the first set of detection results with the moving body in the second set of detection results.

3. The tracking device according to claim 1, wherein the position of the moving body in the first set of detection results and the position of the moving body in the third set of detection results correspond to a region that horizontally and vertically spreads, and the processor sets a region obtained by extending a vertical lower end of a region of the integrated moving body from the first set of detection results to a vertical lower end of the integrated moving body from the second set of detection results as the position of the moving body in the third set of detection results.

4. The tracking device according to claim 1, wherein the processor stores a moving body certainty factor corresponding to an index indicating a probability of determining a moving body candidate corresponding to a candidate for the tracked moving body as a tracking target, estimates a future position of the moving body candidate, and increases or decreases the moving body certainty factor based on a relationship between the estimated future position of the moving body candidate, and the position of the moving body in the third set of detection results, the position of the moving body in the first set of detection results, and the position of the moving body in the second set of detection results to determine the moving body candidate as a new tracked moving body when the moving body certainty factor is greater than or equal to a predetermined value.

5. The tracking device according to claim 1, wherein the processor sets the position of the moving body in the third set of detection results as a tracked position of the tracked moving body when a distance between the estimated future position of the tracked moving body unit and the position of the moving body in the third set of detection results is less than a predetermined distance, and the future direction of movement of the tracked moving body coincides with the direction of movement of the moving body in the third set of detection results, sets the estimated future position as a tracked position of the tracked moving body when a distance between the estimated future position of the tracked moving body and the position of the moving body in the third set of detection results is greater than or equal to a predetermined distance, a distance between the estimated future position of the tracked moving body and the position of the moving body in the first set of detection results is less than a predetermined distance, and the estimated future direction of movement of the tracked moving body coincides with the direction of movement of the moving body in the second set of detection results, and sets the position of the moving body in the second set of detection results as a tracked position of the tracked moving body when a distance between the estimated future position of the tracked moving body and the position of the moving body in the third set of detection results is greater than or equal to a predetermined distance, a distance between the estimated future position of the tracked moving body and the position of the moving body in the first set of detection results is greater than or equal to a predetermined distance, and a distance between the estimated future position of the tracked moving body and the position of the moving body in the second set of detection results is less than a predetermined distance.

6. The tracking device according to claim 1, wherein the processor stores a tracking certainty factor corresponding to an index indicating a probability of tracking of the tracked moving body with respect to each tracked moving body, and increases or decreases the tracking certainty factor based on a relationship between the estimated future position of the tracked moving body, and the position of the moving body in the third set of detection results, the position of the moving body in the first set of detection results, and the position of the moving body in the second set of detection results to exclude the tracked moving body from an object of tracking when the tracking certainty factor is less than or equal to a predetermined value.

7. A tracking device comprising:

a memory;

a camera; and a processor, the processor communicatively coupled to the memory and camera, wherein the processor is configured to:

calculate an optical flow using a plurality of images from the camera, detect a first set of detection results including at least a position and a direction of movement of a moving body based on the calculated optical flow, detect a second set of detection results including at least a position and a direction of movement of the moving body based on a plurality of overhead images generated based on the plurality of images, detect a third set of detection results including at least a position and a direction of movement of the moving body by integrating the first set of detection results and the second set of detection results, determine a moving body to be tracked based on the first set of detection results and the second set of detection results and the third set of detection results, estimate a future position and direction of movement of the tracked moving body, track the tracked moving body and identify a position of the tracked moving body using any one of the respective positions of the moving body detected in the second set of detection results and the third set of detection results and the estimated future position, stores a moving body certainty factor corresponding to an index indicating a probability of determining a moving body candidate corresponding to a candidate for the tracked moving body as a tracking target, estimates a future position of the moving body candidate, and increases or decreases the moving body certainty factor based on a relationship between the estimated future position of the moving body candidate, and the position of the moving body in the third set of detection results, the position of the moving body in the first set of detection results, and the position of the moving body in the second set of detection results to determine the moving body candidate as a new tracked moving body when the moving body certainty factor is greater than or equal to a predetermined value.

* * * * *